(12) United States Patent
Breakstone et al.

(10) Patent No.: US 10,795,584 B2
(45) Date of Patent: *Oct. 6, 2020

(54) DATA STORAGE AMONG A PLURALITY OF STORAGE DRIVES

(71) Applicant: Liqid Inc., Broomfield, CO (US)

(72) Inventors: Jason Breakstone, Broomfield, CO (US); Alok Gupta, Oakland, CA (US); Himanshu Desai, San Jose, CA (US); Angelo Campos, Haledon, NJ (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,721

(22) Filed: Jan. 23, 2019

(65) Prior Publication Data
US 2019/0155519 A1    May 23, 2019

Related U.S. Application Data

(63) Continuation of application No. 15/017,071, filed on Feb. 5, 2016, now Pat. No. 10,191,667, which is a
(Continued)

(51) Int. Cl.
*G06F 3/06* (2006.01)
*G06F 1/30* (2006.01)
(Continued)

(52) U.S. Cl.
CPC .............. *G06F 3/0613* (2013.01); *G06F 1/08* (2013.01); *G06F 1/30* (2013.01); *G06F 3/0604* (2013.01);
(Continued)

(58) Field of Classification Search
CPC ......... G06F 2213/0026; G06F 13/4282; G06F 3/0659; G06F 3/0604; G06F 13/4022;
(Continued)

(56) References Cited

U.S. PATENT DOCUMENTS 5,828,207 A    10/1998   Saadeh
6,061,750 A    5/2000    Beardsley et al.
(Continued)

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.
(Continued)

*Primary Examiner* — Hashem Farrokh

(57) ABSTRACT

A data storage device is presented that includes a plurality of storage drives each comprising an associated drive Peripheral Component Interconnect Express (PCIe) interface. The data storage device also includes a control system configured to receive, over a host PCIe link, write operations for storage of data by the data storage device. The control system is configured to process the write operations against storage allocation information to apportion the data for storage among more than one of the storage drives, and transfer corresponding portions of the data to associated storage drives over corresponding drive PCIe interfaces.

17 Claims, 13 Drawing Sheets

Related U.S. Application Data continuation of application No. 14/204,423, filed on Mar. 11, 2014, now Pat. No. 9,285,827, which is a continuation of application No. 13/270,084, filed on Oct. 10, 2011, now Pat. No. 8,688,926.

(60) Provisional application No. 61/391,651, filed on Oct. 10, 2010.

(51) Int. Cl.
| | |
|---|---|
| *G06F 1/08* | (2006.01) |
| *G06F 13/40* | (2006.01) |
| *G06F 13/42* | (2006.01) |

(52) U.S. Cl.
CPC .......... *G06F 3/0625* (2013.01); *G06F 3/0653* (2013.01); *G06F 3/0659* (2013.01); *G06F 3/0665* (2013.01); *G06F 3/0685* (2013.01); *G06F 3/0688* (2013.01); *G06F 13/4022* (2013.01); *G06F 13/4282* (2013.01); *G06F 2213/0026* (2013.01); *Y02D 10/14* (2018.01); *Y02D 10/151* (2018.01); *Y02D 10/154* (2018.01)

(58) Field of Classification Search
CPC .... G06F 3/0688; G06F 3/0613; G06F 3/0653; G06F 3/0665; G06F 3/0685; G06F 3/0625; G06F 1/30; G06F 1/08; G06F 3/0655; Y02D 10/14; Y02D 10/151; Y02D 10/154
USPC ......................................................... 711/103
See application file for complete search history.

(56) References Cited

U.S. PATENT DOCUMENTS

| | | | |
|---|---|---|---|
| 6,325,636 B1 | 12/2001 | Hipp et al. | |
| 7,243,145 B1 | 7/2007 | Poortman | |
| 7,260,487 B2 | 8/2007 | Brey et al. | |
| 7,315,954 B2 * | 1/2008 | Van Lieu | G06F 1/30 |
| | | | 713/310 |
| 7,505,889 B2 | 3/2009 | Salmonsen et al. | |
| 7,606,960 B2 | 10/2009 | Munguia | |
| 7,725,757 B2 | 5/2010 | Padweka et al. | |
| 7,877,542 B2 | 1/2011 | Chow et al. | |
| 8,125,919 B1 | 2/2012 | Khanka et al. | |
| 8,150,800 B2 | 4/2012 | Webman et al. | |
| 8,656,117 B1 * | 2/2014 | Wong | G06F 9/3836 |
| | | | 710/56 |
| 8,688,926 B2 | 4/2014 | Breakstone et al. | |
| 2002/0059428 A1 | 5/2002 | Susai et al. | |
| 2003/0110423 A1 | 6/2003 | Helms et al. | |
| 2003/0126478 A1 | 7/2003 | Burns et al. | |
| 2004/0156151 A1 | 8/2004 | Morrow | |
| 2005/0223136 A1 | 10/2005 | Tanaka et al. | |
| 2006/0277206 A1 | 12/2006 | Bailey et al. | |
| 2007/0067432 A1 | 3/2007 | Tarui et al. | |
| 2008/0034153 A1 | 2/2008 | Lee et al. | |
| 2008/0198744 A1 | 8/2008 | Menth | |
| 2008/0281938 A1 | 11/2008 | Rai et al. | |
| 2009/0006837 A1 | 1/2009 | Rothman et al. | |
| 2009/0094401 A1 * | 4/2009 | Larson | H04L 45/00 |
| | | | 710/316 |
| 2009/0100280 A1 | 4/2009 | Lindsay | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2009/0216910 A1 * | 8/2009 | Duchesneau | G06F 9/5072 |
| | | | 709/250 |
| 2009/0276551 A1 | 11/2009 | Brown et al. | |
| 2010/0088467 A1 | 4/2010 | Lee et al. | |
| 2010/0153621 A1 | 6/2010 | Kreiner et al. | |
| 2011/0289510 A1 | 11/2011 | Lin et al. | |
| 2011/0299317 A1 | 12/2011 | Shaeffer et al. | |
| 2011/0320690 A1 * | 12/2011 | Petersen | G06F 3/0611 |
| | | | 711/103 |
| 2011/0320861 A1 | 12/2011 | Bayer et al. | |
| 2012/0030544 A1 | 2/2012 | Fisher-Jeffes | |
| 2012/0151118 A1 | 6/2012 | Flynn et al. | |
| 2012/0166699 A1 | 6/2012 | Kumar et al. | |
| 2012/0210163 A1 | 8/2012 | Cho | |
| 2012/0317433 A1 | 12/2012 | Ellis et al. | |
| 2013/0185416 A1 | 7/2013 | Larkin et al. | |
| 2016/0197996 A1 | 7/2016 | Barton et al. | |
| 2016/0248631 A1 | 8/2016 | Duchesneau | |

OTHER PUBLICATIONS

International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
Lu, Yingping et al., "Performance Study of iSCSI-Based Storage Subsystems," IEEE Communications Magazine, pp. 76-82, Aug. 2003.

* cited by examiner

DATA STORAGE AMONG A PLURALITY OF STORAGE DRIVES

RELATED APPLICATIONS

This application is a continuation of, and claims priority to, U.S. patent application Ser. No. 15/017,071, entitled "SYSTEMS AND METHODS FOR OPTIMIZING DATA STORAGE AMONG A PLURALITY OF STORAGE DRIVES," and filed Feb. 5, 2016 (U.S. Pat. No. 10,191,667, with an issue date of Jan. 29, 2019). This patent application is also a continuation of U.S. patent application Ser. No. 14/204,423 that was filed on Mar. 11, 2014, and is entitled "SYSTEMS AND METHODS FOR OPTIMIZING DATA STORAGE AMONG A PLURALITY OF SOLID STATE MEMORY SUBSYSTEMS," which is a continuation of U.S. patent application Ser. No. 13/270,084 that was filed on Oct. 10, 2011, and is entitled "SYSTEMS AND METHODS FOR OPTIMIZING DATA STORAGE AMONG A PLURALITY OF SOLID STATE MEMORY SUBSYSTEMS," which is also related to and claims priority to U.S. Provisional Patent Application No. 61/391,651, entitled "Apparatus and System for Modular Scalable Composite Memory Device," filed on Oct. 10, 2010. U.S. patent application Ser. No. 13/270,084 and U.S. Provisional Patent Application No. 61/391,651 are hereby incorporated by reference into this patent application.

TECHNICAL FIELD

Aspects of the disclosure are related to the field of computer data storage, and in particular, data storage systems employing solid state storage elements.

TECHNICAL BACKGROUND

Computer systems typically include bulk storage systems, such as magnetic disc drives, optical storage devices, tape drives, or solid state storage drives, among other storage systems. In these computer systems, a host system, such as a network device, server, or end-user computing device, communicates with external bulk storage systems to store data or to access previously stored data. These bulk storage systems are traditionally limited in the number of devices that can be addressed in total, which can be problematic in environments where higher capacity or higher performance is desired.

One such storage technology variety, namely solid state media, typically relies upon non-moving underlying storage medium elements, such as flash memory, phase change memory, magnetoresistive random access memory (MRAM), or other media. Although the solid state memory types can see increased throughput relative to moving disc and tape media, these solid state memory types still have throughput limitations. Also, data access in some solid state media is typically performed in large blocks, such as in NAND flash memory, and the desired data portions must be accessed and parsed by the underlying storage media control elements before subsequent reads or writes can occur. Also, typical solid state memory drives exchange data over a single physical link, which further limits data access flexibility and throughput. However, increasing data storage and retrieval in networked, cloud, and enterprise environments find these limitations of solid state memory and associated drive electronics increasingly troublesome.

Overview

In the examples discussed herein, a plurality of solid state memory subsystems are included in a single device and managed by a storage processing system separate from a host system. Each of the plurality of memory subsystems are internally addressed and mapped by the storage processing system in a parallel manner over multiple channels to allow increased capacity, reduced latency, increased throughput, and more robust feature sets than traditional bulk storage systems.

Examples disclosed herein include systems, methods, and software of solid state storage devices. A data storage device is presented that includes a plurality of storage drives each comprising an associated drive Peripheral Component Interconnect Express (PCIe) interface. The data storage device also includes a control system configured to receive, over a host PCIe link, write operations for storage of data by the data storage device. The control system is configured to process the write operations against storage allocation information to apportion the data for storage among more than one of the storage drives, and transfer corresponding portions of the data to associated storage drives over corresponding drive PCIe interfaces.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
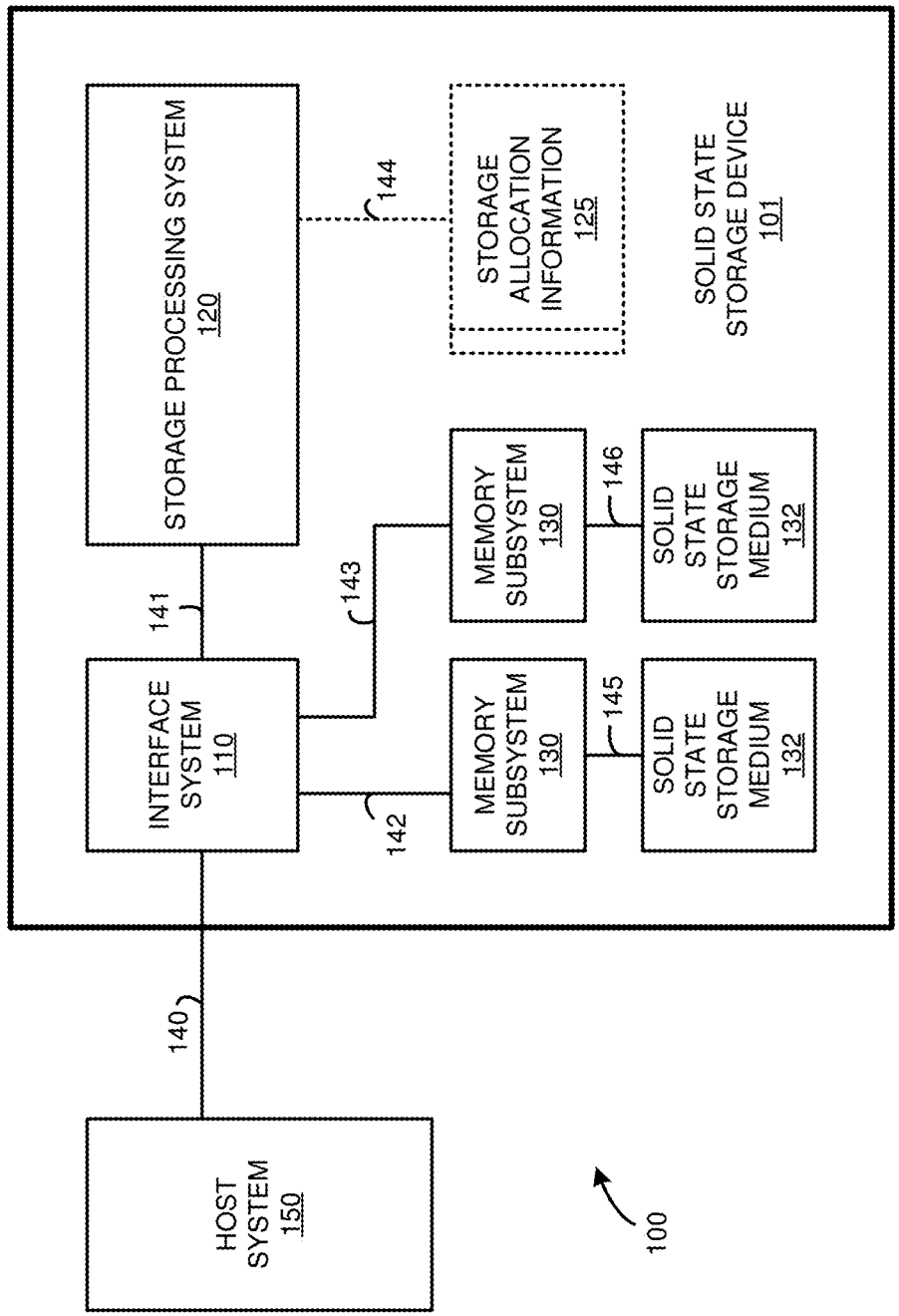
FIG. 1 is a system diagram illustrating a storage system.

FIG. 1 is a system diagram illustrating storage system 100. Storage system 100 includes solid state storage device 101 and host system 150. Solid state storage device 101 and host system 150 communicate over link 140. In FIG. 1, host system 150 can transfer data to be stored by solid state storage device 101, such as a 'write' transaction where solid state storage device 101 stores associated data on a computer-readable storage medium, namely ones of solid state storage media 132. Host system 150 can also request data previously stored by solid state storage device 101, such as during a 'read' transaction, and solid state storage device 101 retrieves associated data from ones of solid state storage media 132 and transfers the requested data to host system 150. Additionally, further transactions than writes and reads could be handled by the elements of solid state storage device 101, such as metadata requests and manipulation, file or folder deletion or moving, volume information requests, file information requests, or other transactions.

Solid state storage device 101 includes interface system 110, storage processing system 120, storage allocation information 125, two memory subsystems 130, and two solid state storage media 132. Links 140-146 each comprise physical, logical, or virtual communication links, capable of communicating data, control signals, instructions, or commands, along with other information. Links 141-146 are configured to communicatively couple the associated elements of solid state storage device 101, whereas link 140 is configured to communicatively couple solid state storage device 101 to external systems, such as host system 150. In some examples, links 141-146 are encapsulated within the elements of solid state storage device 101, and may be a software or logical links. Also, in the examples herein, communications exchanged with a host system are typically referred to as 'front-end' communications, and communications exchanged with memory subsystems are typically referred to as 'back-end' communications.

Interface system 110 includes interface circuitry and processing systems to exchange data for storage and retrieval with host system 150 over link 140, as well as to exchange data for processing by storage processing system 120 over link 141. In typical examples, interface system 110 receives instructions and data from host system 150 over an aggregated link, where multiple physical interfaces each comprising a physical communication layer are bonded to form a combined-bandwidth link. Interface system 110 formats the received instructions and associated data for transfer to a central processing system, such as storage processing system 120. Interface system 110 also formats data and information for transfer to host system 150.

Storage processing system 120 includes a processor and non-transitory computer readable memory which includes computer-readable instructions such as firmware. These instructions, when executed by storage processing system 120, instruct storage processing system 120 to operate as described herein. For example, storage processing system could be configured to receive data and instructions transferred by interface system 110, and process the data and instructions to optimize storage and retrieval operations. Write and read instructions and data are processed against storage allocation information 125 to optimize data transfer, such as parallelization, interleaving, portion sizing, portion addressing, or other data transfer optimizations for data storage and retrieval with memory subsystems. Storage processing system 120 and storage allocation information 125 are shown communicatively coupled over link 144, although in other examples, storage allocation information 125 could be included in storage processing system 120 or other circuitry.

Memory subsystems 130 each include circuitry to store and retrieve optimized data portions with solid state storage media 132 over associated links 145-146 and exchange the data with interface system 110 over associated links 142-143. Solid state storage media 132 each include a solid state storage array, such as flash memory, static random-access memory (SRAM), magnetic memory, phase change memory, or other non-transitory, non-volatile storage medium. Although two of memory subsystems 130 and solid state storage media 132 are shown in FIG. 1, it should be understood that a different number could be included.

Links 140-146 each use various communication media, such as air, space, metal, optical fiber, or some other signal propagation path, including combinations thereof. Links 140-146 could each be a direct link or might include various equipment, intermediate components, systems, and networks. Links 140-146 could each be a common link, shared link, aggregated link, or may be comprised of discrete, separate links. Example types of each of links 140-146 could comprise serial attached SCSI (SAS), aggregated SAS, Ethernet, small-computer system interface (SCSI), integrated drive electronics (IDE), Serial AT attachment interface (ATA), parallel ATA, FibreChannel, InfiniBand, Thunderbolt, universal serial bus (USB), FireWire, peripheral component interconnect (PCI), PCI Express (PCIe), communication signaling, or other communication interface types, including combinations or improvements thereof.

The elements of FIG. 1 could be included in a single enclosure, such as a case, with an external connector associated with host interface 140 to communicatively couple the associated elements of solid state storage device 101 to external systems, connectors, cabling and/or transceiver elements. The enclosure could include various printed circuit boards with the components and elements of solid state storage device 101 disposed thereon. Printed circuit traces, flexible printed circuits, or discrete wires could be employed to interconnect the various elements of solid state storage device 101. If multiple printed circuit boards are employed, inter-board connectors or cabling are employed to communicatively couple each printed circuit board.

Figure 2:
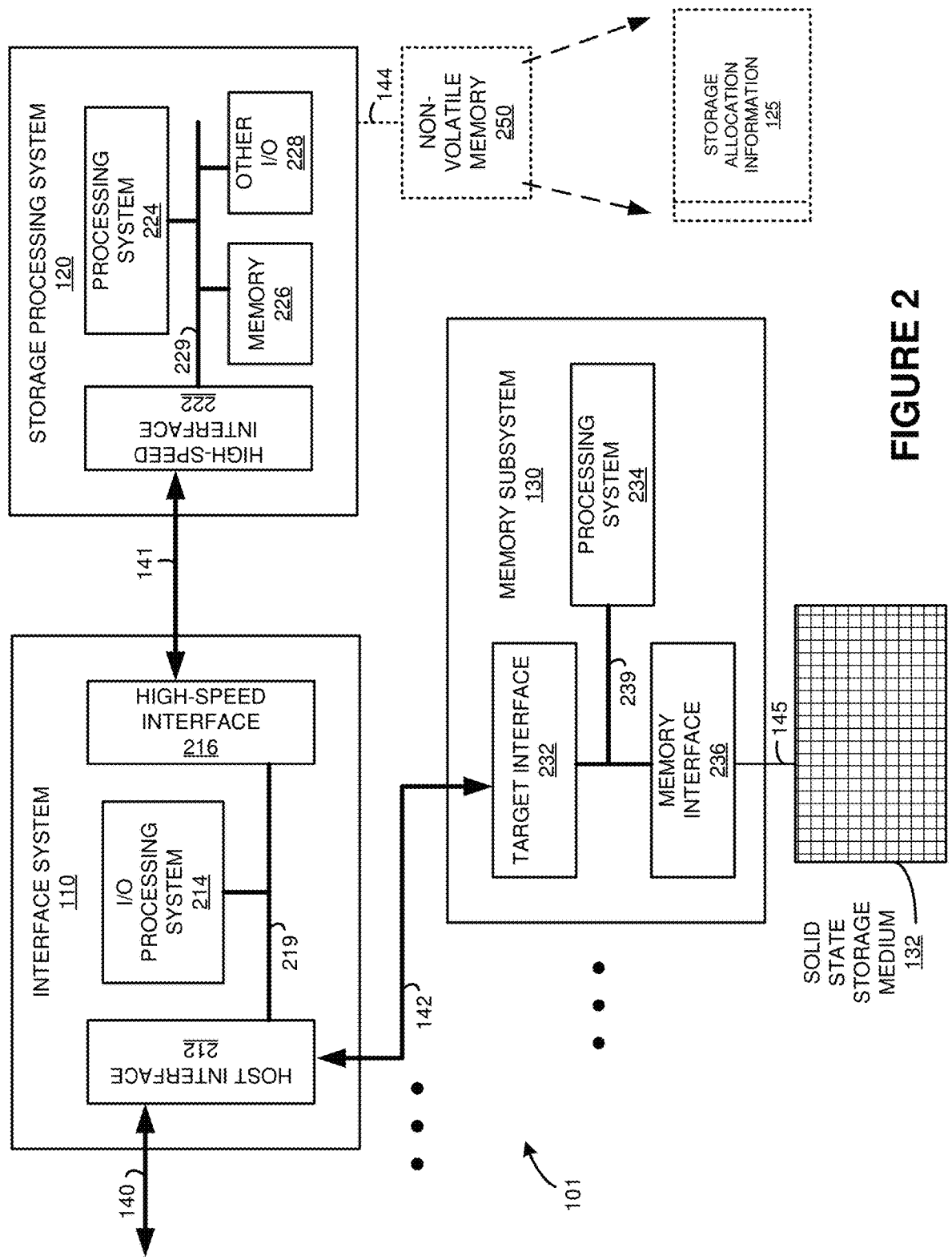
FIG. 2 is a block diagram illustrating a solid state storage device.

FIG. 2 includes example embodiments of several elements of solid state storage device 101. Specifically, FIG. 2 includes interface system 110, storage processing system 120, memory subsystem 130, and solid state storage medium 132. It should be understood that the elements of FIG. 2 are merely exemplary, and could include other configurations. Furthermore, elements of FIG. 2 could also be exemplary embodiments of the elements described in FIGS. 3-13. As indicated by the ellipses in FIG. 2, further memory subsystems and solid state storage media could be included, along with associated interfaces.

In FIG. 2, interface system 110 includes host interface 212, input/output (I/O) processing system 214, and high-speed interface 216. Host interface 212, I/O processing system 214, and high-speed interface 216 each communicate over bus 219, although discrete links could be employed. Host interface 212 includes connectors, buffers, transceivers, and other input/output circuitry to communicate with a host system over external device interface 140. External device interface 140 could include multiple physical links aggregated into a single interface. I/O processing system 214 includes a processor and memory for exchanging data between host interface 212 and high-speed interface 216, as well as controlling the various features of host interface 212 and high-speed interface 216. Host interface 212 also communicates with memory subsystem 130 over internal device interface 142 in this example. As shown in FIG. 2, host interface 212 communicates with both an external host system and memory subsystem 130 using a similar communication interface and protocol type. Although external device interface 140 may include an external connector, internal device interface 142 may instead employ circuit traces or internal connectors. External device interface 140 and internal device interface 142 could each comprise an aggregated or non-aggregated serial interface, such as serial-attached SCSI (SAS), although other interfaces could be employed. High-speed interface 216 includes buffers, transceivers, and other input/output circuitry to communicate over internal storage interface 141. Internal storage interface 141 could comprise a multi-lane high-speed serial interface, such as PCI-Express (PCIe), although other interfaces could be employed. Interface system 110 may be distributed or concentrated among multiple elements that together form the elements of interface system 110.

FIG. 2 also includes storage processing system 120, which includes high-speed interface 222, processing system 224, memory 226, and other I/O 228. High-speed interface 222, processing system 224, memory 226, and other I/O 228 each communicate over bus 229, although discrete links could be employed. High-speed interface 222 includes buffers, transceivers, and other input/output circuitry to communicate over internal storage interface 141. Processing system 224 includes a processor and memory for processing data against storage allocation information 125 to determine ones of memory subsystem 130 to store the data on, to parallelize the data for interleaved storage across ones of the lanes of high-speed interface 222 or multiple memory subsystems, among other operations including reconstructing parallelized data during read operations. Processing system 224 may store data and executable computer-readable processing instructions on memory 226 or within optional non-volatile memory 250, which could include random-access memory (RAM). Other I/O 228 includes other various interfaces for communicating with processing system 224, such as power control interfaces, SMBus interfaces, system configuration and control interfaces, or an interface to communicate with non-volatile memory 250 over link 144. Optional non-volatile memory 250 comprises a non-transitory computer-readable medium, such as static RAM, flash memory, electronically erasable and reprogrammable memory, magnetic memory, phase change memory, optical memory, or other non-volatile memory. Non-volatile memory 250 is shown to include storage allocation information 125, and could include further information. Storage allocation information 125 includes tables, databases, linked lists, trees, or other data structures for indicating where data is stored within and among a plurality of memory subsystems 130. In some examples, storage allocation information 125 is stored within storage processing system 120, such as within memory 226. Storage processing system 120 may be distributed or concentrated among multiple elements that together form the elements of storage processing system 120.

FIG. 2 also includes memory subsystem 130, which includes target interface 232, processing system 234, and memory interface 236. Target interface 232, processing system 234, and memory interface 236 communicate over bus 239, although discrete links could be employed. Target interface 232 includes buffers, transceivers, and other input/output circuitry to communicate with over internal device interface 142. Processing system 234 includes a processor and memory for exchanging data between target interface 232 and memory interface 236, as well as controlling the various features of target interface 232 and memory interface 236. Memory interface 236 includes buffers, transceivers, and other input/output circuitry to communicate and control solid state storage medium 132. Memory interface 236 could also include memory technology-specific circuitry, such as flash memory electronic erasing and reprogramming circuitry, phase change memory write circuitry, or other circuitry to store data within and read data from solid state storage medium 132 over interface 145. Solid state storage medium comprises memory elements and interface circuitry, where the memory elements could comprises a non-transitory computer-readable medium, such as static RAM, flash memory, electronically erasable and reprogrammable memory, magnetic memory, phase change memory, optical memory, or other non-volatile memory.

In further examples, processing system 234 of memory subsystem 130 comprises an application specific processor used to provide performance off-loading from processing system 120. Some examples of performance off-loading includes memory wear-leveling, bad block management, error-detection and correction, parallel addressing and data channeling to individual solid state media included therein.

Figure 3:
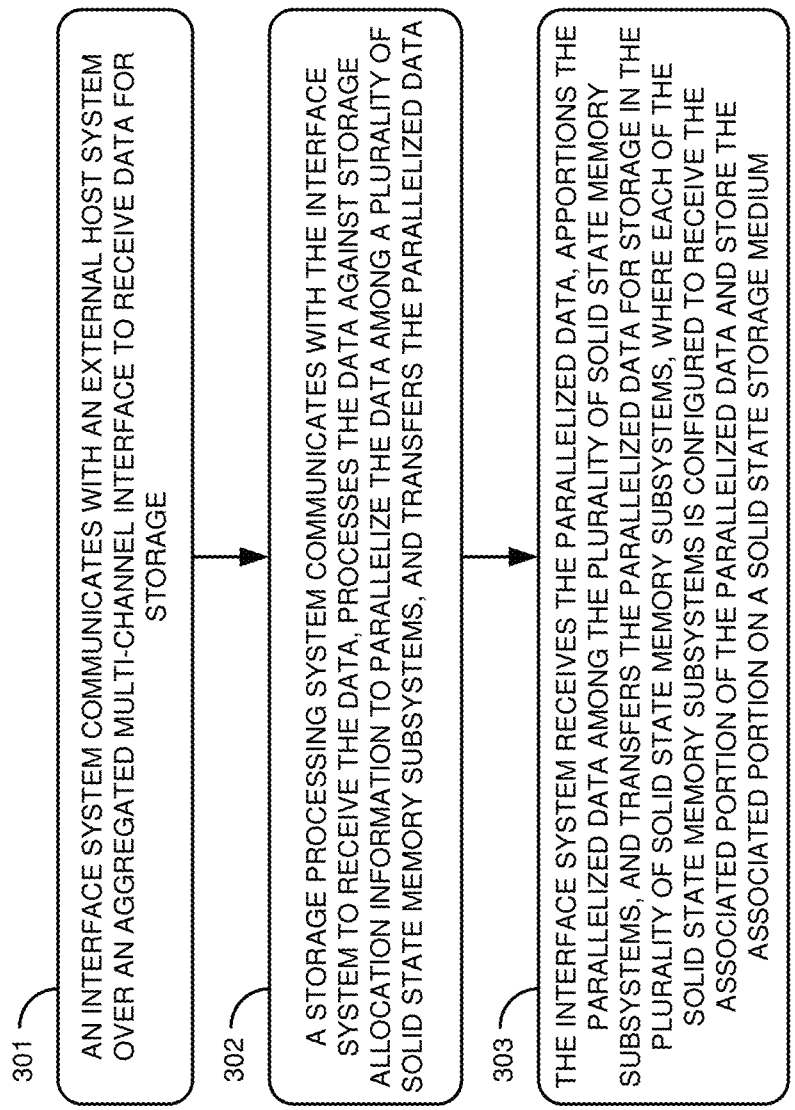
FIG. 3 is a flow diagram illustrating a method of operation of a solid state storage device.

FIG. 3 is a flow diagram illustrating a method of operation of solid state storage device 101. The operations of FIG. 3 are referenced herein parenthetically. In FIG. 3, interface system 110 communicates (301) with external host system 150 over aggregated multi-channel interface 140 to receive instructions and data for storage. The data for storage could be included with a 'write' instruction or series of commands which indicates data to be written and possibly further information, such as a storage location, storage address, write address, volume information, metadata, or other information associated with the data. Host system 150 transfers the data over link 140, and the data is received by interface system 110 of solid state storage system 101. Interface system 110 could provide an acknowledgment message to host system 150 in response to successfully receiving the write instruction and associated data. In some examples, host interface 212 of FIG. 2 receives the data over link 140 and then transfers the data over bus 219 for processing and formatting by I/O processing system 214, and subsequent transfer by high-speed interface 216 over link 141.

Storage processing system 120 communicates (302) with interface system 110 to receive the data and associated write instruction information, processes the data against storage allocation information 125 to parallelize the data among a plurality of solid state memory subsystems 130, and transfers the parallelized data. Storage processing system 120 receives the data over link 141. In some examples, high-speed interface 222 receives the data and associated information over link 141 and transfers the data and associated information over bus 229. Storage processing system 120 processes the data against storage allocation information 125 to determine which memory subsystems will store the data, and parallelizes the data among several memory subsystems. In this example, two memory subsystems 130 are included, and the data is parallelized among each. The data parallelization could include breaking the data into individual portions for storage on an associated memory subsystem, where the individual portions are then transferred over link 141 by storage processing system 120. The individual portions could be transferred by high-speed interface 222 over link 141. In other examples, the data is interleaved among multiple memory subsystems, such as by striping or mirroring. Storage allocation information 125 typically includes a table, database, tree, or other data structure for indicating where data is stored among multiple memory subsystems as well as other information, such as metadata, file system structure information, volume information, logical drive information, virtual drive information, among other information for storing, retrieving, and handling data stored within solid state storage device 101. Storage processing system 120 could perform other operations on the data, such as read-modify-writes, read-modify-write caching, encryption, encoding, implementing a redundancy scheme, calculating redundancy information, compression, or de-duplication of data during storage and subsequent retrieval, among other operations.

Interface system 110 receives (303) the parallelized data, apportions the parallelized data among the plurality of solid state memory subsystems 130, and transfers the parallelized data for storage by the plurality of solid state memory subsystems 130. The parallelized data is received over link 141 in this example, and subsequently transferred by interface system 110 over ones of links 142-143. In some examples, the data portion is received by target interface 232 and transferred over bus 239. Transferring the data portions over links 142-143 could include initiating a 'write' command with each associated memory subsystem 130 for the individual portion of data, and transferring the individual portion of data along with the associated write command to the appropriate memory subsystem 130. Additional data could accompany the parallelized data, such as addressing information, identifiers for the associated memory subsystem, metadata, or other information.

Each of solid state memory subsystems 130 is configured to receive the associated portion of the parallelized data and store the associated portion on associated solid state storage medium 132. Memory interface 236 could transfer the associated portion for storage over link 145-146. Link 145-146 could include multiple links or busses, such as row/column lines, control, address, and data lines, or other configurations. Processing system 234 could instruct memory interface 236 to perform wear-level optimization, bad block handling, write scheduling, write optimization, garbage collection, or other data storage operations.

Although the operations of FIG. 3 discuss a write operation for storage of data by solid state storage device 101, a retrieval or read operation could proceed as well. In a retrieval operation, host system 150 informs solids state storage device 101 of data desired to be retrieved over link 140, such as via a read instruction. Interface system 110 receives this retrieve instruction, and transfers the read instruction to storage processing system 120. Interface system 110 could provide an acknowledge message to host system 150 in response to successfully receiving the read instruction. Storage processing system 120 would process the retrieve command against storage allocation information 125 to determine which of memory subsystems 130 have access to the desired data. Storage processing system 120 then issues individual parallel read commands to interface system 110 which subsequently informs associated memory subsystems 130 to retrieve the data portions from associated solid state storage media 132. Interface system 110 may then receive the data portions and transfer to storage processing system 120 for de-parallelization, merging, or for performing other operations, such as decrypting or de-duplication. The storage allocation information could be processed against the data portions during a read to de-parallelize the data into merged data. Storage processing system 120 then transfers the assembled data for delivery to host system 150 through interface system 110.

Figure 4:
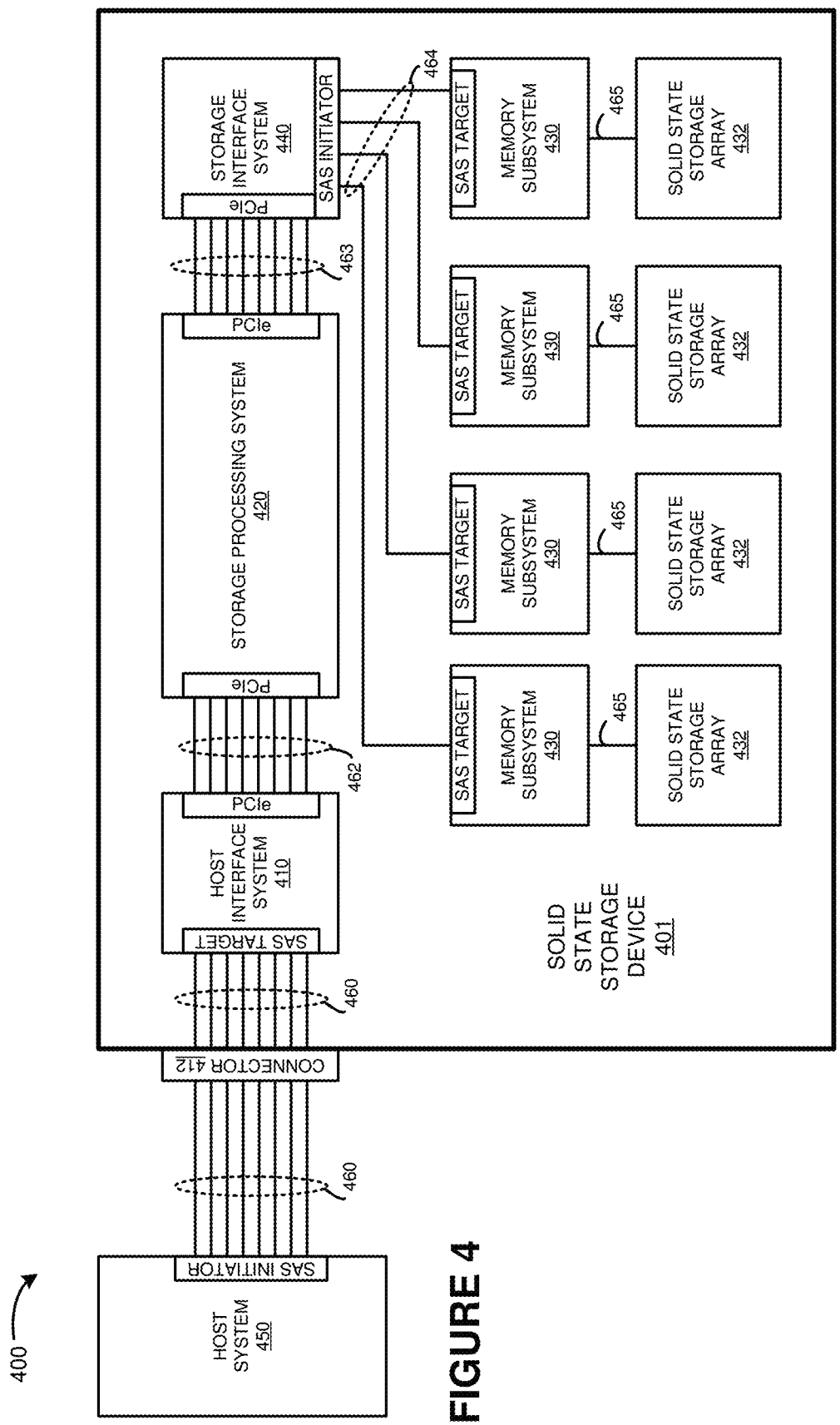
FIG. 4 is a system diagram illustrating a storage system.

FIG. 4 is a system diagram illustrating storage system 400, as an example of elements of storage system 100 found in FIG. 1, although storage system 100 could use other configurations. Storage system 400 includes solid state storage device 401 and host system 450. Solid state storage device 401 and host system 450 communicate over link 460, which is an aggregated serial attached SCSI (SAS) interface in this example. In FIG. 4, host system 450 can transfer data to be stored by solid state storage device 401, such as a 'write' operation where solid state storage device 401 stores associated data on a computer-readable storage medium, namely ones of solid state storage arrays 432. Host system 450 can also request data previously stored by solid state storage device 401, such as during a 'read' operation, and solid state storage device 401 retrieves associated data and transfers the requested data to host system 450. Solid state storage device 401 includes host interface system 410, storage processing system 420, memory subsystems 430, solid state storage arrays 432, and storage interface system 440.

The SAS interface is employed in this example as a native drive interface, where a native drive interface is typically used by a computer system, such as host 450, for direct access to bulk storage drives. For example, the SAS interface is bootable and does not typically require custom drivers for an operating system to utilize the SAS interface. Link aggregation for host interface 460 can be performed during a configuration process between host 450 and configuration elements of solid state storage device 401, such as firmware elements. In contrast, PCIe interfaces employed internally to solid state storage device 401 are typically non-native drive interfaces, where PCIe is typically not used by a computer system for direct access to bulk storage drives. For example, the PCIe interface does not typically support bootable devices attached thereto, and requires custom device-specific drivers for operating systems to optimally access the associated devices. However, in some examples, instead of a SAS-based front-end host interface, a PCIe or SATA-based front end host interface could be employed.

Host interface system 410 includes interface circuitry to exchange data for storage and retrieval with host system 450 over an aggregated SAS interface, namely link 460. Host interface system 410 includes an SAS target portion to communicate with an SAS initiator portion of host system 450. Link 460 includes an aggregated SAS interface, which could include eight individual SAS links merged into a single logical SAS link, or could include a subset of the eight individual links merged into a logical link. Connector 412 serves as a user-pluggable physical connection point between host system 450 and solid state storage device 401. Link 460 could include cables, wires, or optical links, including combinations thereof. Host interface system 410 also includes a PCI Express (PCIe) interface and associated circuitry. The PCIe interface of host interface 410 communicates over a multi-lane PCIe interface 462 with storage processing system 420. In this example, eight lanes are shown, which could comprise a 'x8' PCIe interface, although other configurations and numbers of lanes could be used.

Although in this example, host interface system 410 includes an SAS target portion, in further examples, host interface system 410 could include an SAS initiator portion. The SAS initiator portion could be employed to manage, control, or issue commands to other solid state storage devices. In yet further examples, link 460 could include wireless portions, such as a wireless SAS interface, or other wireless communication and networking communication links.

Storage processing system 420 includes a microprocessor and memory with executable computer-readable instructions. Storage processing system 420 processes the data for storage and retrieval against storage allocation information as well as exchanges the data to be stored, or instructions to retrieve data, with both host interface system 410 and storage interface system 440. Storage processing system 420 executes computer-readable instructions to operate as described herein. As with host interface system 410, storage processing system 420 includes a PCIe interface for communicating over link 462 with host interface system 410. Storage processing system 420 also includes a further PCIe interface for communicating with storage interface system 440 over x8 PCIe link 463. In this example, storage processing system 420 includes two PCIe interfaces with eight PCIe lanes each, although other configurations and numbers of lanes could be used.

Storage interface system 440 includes interface circuitry to exchange data and storage instructions between storage processing system 420 and a plurality of memory subsystems, namely memory subsystems 430. Storage interface system 440 includes a PCIe interface for communicating with storage processing system 420 over link 463, and a SAS interface for communicating with each of memory subsystems 430 over associated ones of links 464. In this example, storage interface system 440 includes one PCIe interface 463 with eight PCIe lanes, although other configurations and numbers of lanes could be used. Also in this example, storage interface system 440 communicates over a single SAS link with each of memory subsystems 430, and includes an SAS initiator portion for communicating with SAS target portions of each memory subsystem 430 over SAS links 464. Although host interface system 410 and storage interface system 440 are shown as separate elements in FIG. 4, in other examples, these elements could be included in a single system, such as shown in interface system 110 or interface system 810, although other configurations could be employed. Also, in other examples, instead of a PCIe interface for link 463, a SAS, SATA, or other aggregated or multi-lane serial link could be employed. Likewise, instead of an SAS interface for link 464, PCIe, SATA, or other links could be employed.

Memory subsystems 430 each include circuitry to store and retrieve data from associated ones of solid state storage arrays 432 over associated links 465 and exchange the data with storage interface system 440 over associated SAS links 464. Memory subsystems 430 also each include an SAS target portion for communicating with the SAS initiator portion of storage interface system 440. Solid state storage arrays 432 each include a solid state storage medium, such as flash memory, static random-access memory, magnetic memory, or other non-volatile memory. Although four of memory subsystems 430 and solid state storage arrays 432 are shown in FIG. 4, it should be understood that a different number could be included with an associated additional link 464.

Figure 5:
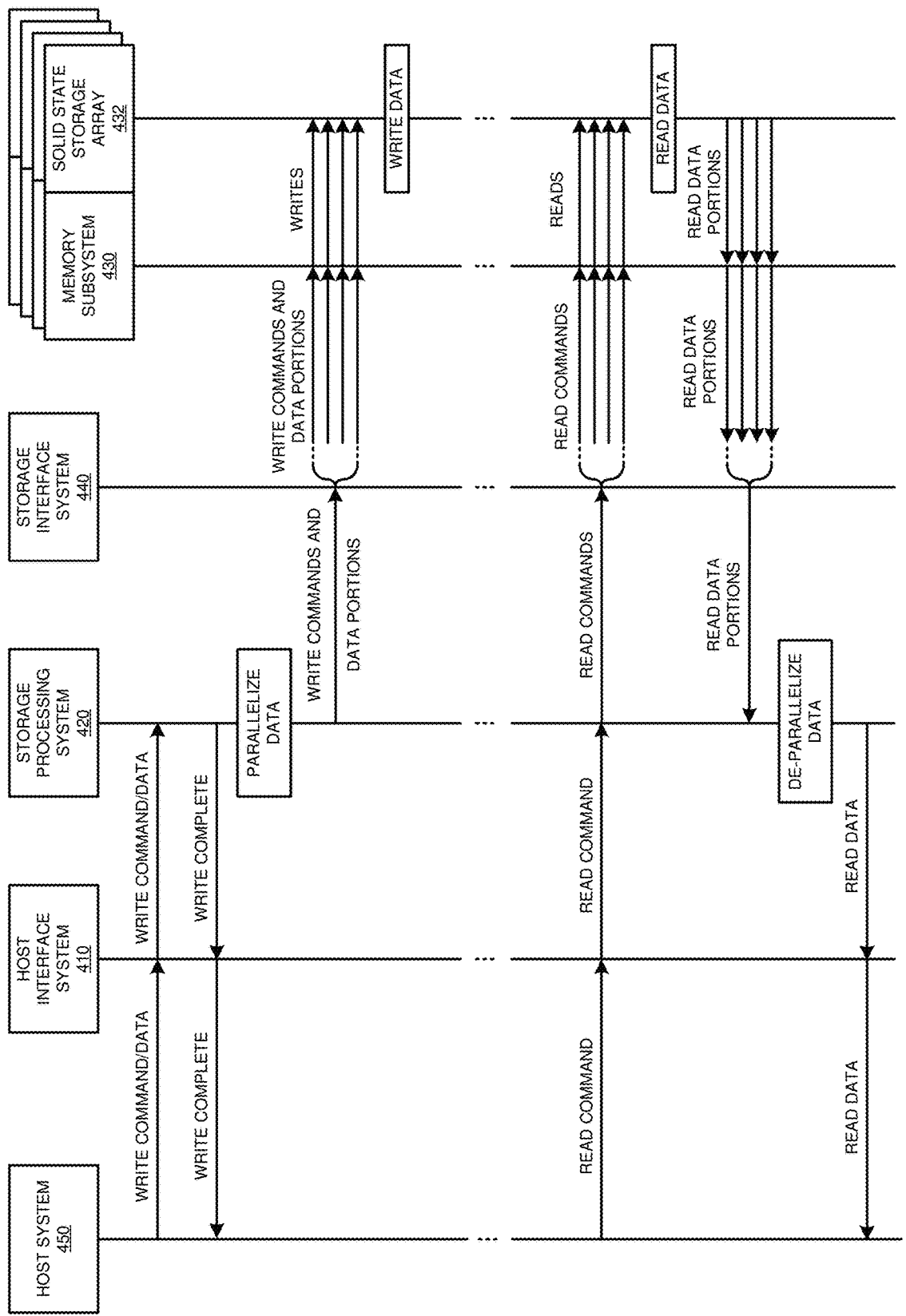
FIG. 5 is a sequence diagram illustrating a method of operation of a solid state storage device.

FIG. 5 is a sequence diagram illustrating a method of operation of solid state storage device 401. In FIG. 5, host system 450 transfers a write command and associated data to be written to host interface system 410. The write command typically includes information on the write command as well as a storage location indicator, such as a storage address at which to store the data. The write command and data is transferred over aggregated SAS link 460 in this example, and received by the SAS target portion of host interface system 410. Host interface system 410 could optionally provide an acknowledge message to host system 450 in response to successfully receiving the write command and associated data. Host interface system 410 then transfers the write command and data to storage processing system 420 over PCIe interface 462. In typical examples, host interface system 410 modifies the write command or data into a different communication format and protocol for transfer over interface 462, which could include generating a new write command and associating the data with the new write command for transfer over interface 462 for receipt by storage processing system 420.

As shown in FIG. 5, storage processing system 420 receives the write command and data and issues a 'write complete' message back to host interface system 410. Host interface system 410 then transfers the write complete message or associated information for receipt by host system 450. The write complete message indicates that host system 450 is free to initiate further commands or end the write process associated with the write command described above. In some examples, the write complete message is associated with command queuing. In yet other examples, a 'write-through' operation could be performed. In a 'write-through' operation, a write complete message is not generated until the associated data has been committed to associated ones of the memory subsystems or to associated ones of the solid state storage media. A 'write-back' operation could also instead be performed, where host interface system 410 initiates and transfers a write complete message to host system 450 in response to receiving the write data, which could further reduce latency for host system 450.

Storage processing system 420 then parallelizes the data for storage across multiple memory subsystems. In this example, storage processing system 420 processes storage location information associated with the received data against storage allocation information to determine a parallelization. Parallelizing data includes breaking the data into smaller portions, where each portion is intended for transfer across a different storage interface and subsequent storage by a different storage medium. Parallelizing also includes generating multiple write commands for each data portion. In this example, the data is parallelized into at least four portions. In other examples, a redundancy scheme is applied to the data, and the portions of data could include redundant data portions, parity data, checksum information, or other redundancy information. Parallelizing the data could also include interleaving the data across several storage interfaces and associated storage media. Once the data is parallelized, storage processing system 420 transfers parallelized write commands and parallelized data portions to storage interface system 440. In this example, PCIe interface 463 between storage processing system 420 and storage interface system 440 includes eight lanes, and the data could be transferred in parallel across all eight lanes, or a subset thereof.

Storage interface system 440 receives the parallelized write commands and parallelized data portions over PCIe interface 463 and in response initiates writes over each of SAS interfaces 464 for each of the parallelized data portions. The SAS target portion of each of memory subsystems 430 receives the associated writes and parallelized data portion, and in response, issues associated writes to the associated solid state storage media. The write operation originally transferred by host system 450 for data storage by solid state storage device 401 completes when the data is written to the associated solid state storage arrays.

At a later time, host system 450 issues a read request. The read request is transferred as a read command over SAS interface 460 for receipt by host interface system 410. The read command could include read command information such as storage location information, and a destination address for the read data once retrieved. Host interface 410 receives the read command and in response issues a read command over PCIe interface 462 for receipt by storage processing system 420. Storage processing system 420 processes the read command against storage allocation information to determine where the data requested in the read command is located or stored. Since data in previous write operations was parallelized and stored on different solid state storage arrays, the data must then be retrieved from these arrays. Thus, storage processing system 420 determines individual locations to issue read commands for, and transfers these individual read commands over PCIe interface 463 for receipt by storage interface system 440. Storage interface system 440 issues parallel read commands over individual ones of SAS interfaces 464 for receipt by ones of memory subsystems 430. Ones of memory subsystems 430 issue reads to retrieve the data from solid state memory arrays 432. The read data is transferred by memory subsystems 430 and storage interface system 440 over the associated SAS and PCIe interfaces for receipt by storage processing system 420.

Storage processing system 420 receives the read data, and processes the individual read data portions against the storage allocation information and the read command information to reassemble or merge the individual read data portions into de-parallelized data. The de-parallelized data is then transferred over PCIe interface 462 for subsequent transfer by host interface system 410 over SAS interface 460 for receipt by host system 450. The read operation originally transferred by host system 450 for data retrieval by solid state storage device 401 completes when the data is successfully transferred to host system 450.

Figure 6:
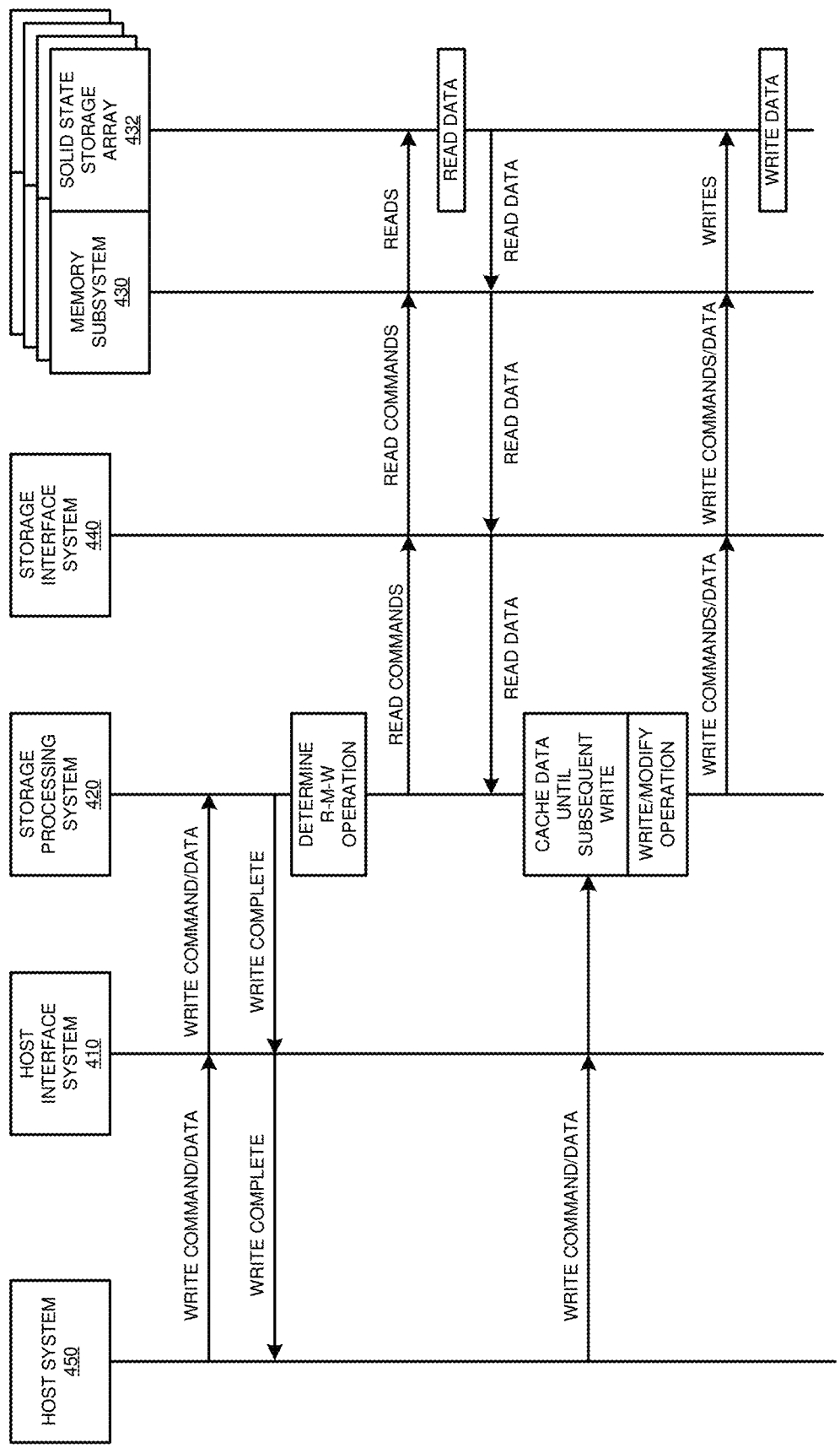
FIG. 6 is a sequence diagram illustrating a method of operation of a solid state storage device.

FIG. 6 is a sequence diagram illustrating a method of operation of solid state storage device 401 for optimization of read-modify-write operations. In FIG. 6, host system 450 transfers a write command and associated data to be written to host interface system 410. The write command typically includes information on the write command as well as a storage location indicator, such as a storage address at which to store the data. The write command and data is transferred over aggregated SAS link 460 in this example, and received by the SAS target portion of host interface system 410. Host interface system 410 could optionally provide an acknowledgment message to host system 450 in response to successfully receiving the write command and associated data. Host interface system 410 then transfers a related write command and data to storage processing system 420 over PCIe interface 462. In typical examples, host interface system 410 modifies the write command or data into a different communication format and protocol for transfer over interface 462, which could include generating a new write command and associating the data with the new write command for transfer over interface 462 for receipt by storage processing system 420. Storage processing system 420 receives the write command and data and issues a 'write complete' message back to host interface system 410. Host interface system 410 then transfers the write complete message or associated information for receipt by host system 450. The write complete message indicates that host system 450 is free to initiate further commands or end the write process associated with the write command described above. In some examples, the write complete message is associated with command queuing.

Storage processing system 420 then determines that a read-modify-write operation would need to be performed to write the data. The determination is based on storage allocation information and information received with the read command. For example, in some types of storage media, such as flash memory, data manipulation occurs in large blocks due to limitations of the underlying media technology. If the amount of data to be written is less than a desired block size, then a read-modify-write would need to be performed. Additionally, the data to be written could be parallelized as discussed in FIG. 5. In this example, storage processing system 420 processes a storage location associated with the received data against storage allocation information to determine a portion of stored data to read before the data received from host system 450 is written. Since data in previous write operations may have been parallelized and stored on different solid state storage arrays, the data must then be retrieved from these arrays. Thus, storage processing system 420 determines individual locations to issue read commands for, and transfers these individual read commands over PCIe interface 463 for receipt by storage interface system 440. Storage interface system 440 issues parallel read commands over individual ones of SAS interfaces 464 for receipt by ones of memory subsystems 430. Ones of memory subsystems 430 issue read operations to retrieve the data from solid state memory arrays 432. The read data is transferred by memory subsystems 430 and storage interface system 440 over the associated SAS and PCIe interfaces for receipt by storage processing system 420. Although multiple parallel arrowheads are not used in FIG. 6 for clarity, it should be understood that these could be used as shown in FIG. 5 for parallel operations.

Once storage processing system 420 receives the read data, storage processing system 420 modifies the read data with the write data received from host system 450 to create read-modified-write data. This read-modified-write data comprises the read data as modified by the write data. However, instead of immediately writing the read-modified-write data to ones of the memory systems, storage processing system 420 caches the read-modified-write data in anticipation of further writes to the same portion or block of data. If such a subsequent write is received, then storage processing system 420 further modifies the read-modified-write data. Storage processing system 420 could wait for further writes until a threshold amount of data has been modified due to subsequent writes before committing the data to ones of the memory subsystems. Although the data to be modified is read before subsequent writes are received in this example, in other examples, storage processing system 420 caches the write data for a plurality of write instructions until a threshold amount of data has been modified for a particular memory block or plurality of blocks, then the data is committed to ones of memory subsystems. In some examples, a read may not be required, as the initial write data and subsequent writes modify an entire block or blocks of data and the full block or blocks can be committed from the cached location to ones of the memory subsystems. Various combinations of the above reads and writes could be performed.

Once the data is ready for storage to ones of the memory subsystems, storage processing system 420 parallelizes the read-modified-write data for storage across multiple computer-readable storage media. In this example, storage processing system 420 processes storage location information associated with the received write data against storage allocation information and location information for the read data to determine a parallelization. Parallelizing data includes breaking the data into smaller portions, where each portion is intended for transfer across a different storage interface and subsequent storage by a different storage medium. In this example, the read-modified-write data is parallelized into at least four portions. In other examples, a redundancy scheme is applied to the read-modified-write data, and the portions of data could include redundant data portions, parity data, checksum information, or other redundancy information. Parallelizing the read-modified-write data could also include interleaving the data across several storage interfaces and associated storage media. Once the read-modified-write data is parallelized, storage processing system 420 transfers parallelized write commands and parallelized read-modified-write data portions to storage interface system 440. In this example, PCIe interface 463 between storage processing system 420 and storage interface system 440 includes eight lanes, and the data could be transferred in parallel across all eight lanes, or a subset thereof.

Storage interface system 440 receives the parallelized write commands and parallelized read-modified-write data portions over PCIe interface 463 and in response initiates write commands over each of SAS interfaces 464 for each of the parallelized data portions. The SAS target portion of each of memory subsystems 430 receives the associated write commands and parallelized data portion, and in response, issues associated write operations to the associated solid state storage media. The write command operation transferred by host system 450 for data storage by solid state storage device 401 completes when the read-modified-write data is written to the associated solid state storage arrays.

In further examples, data could be written in alternate or complementary ways than a read-modify-write to ones of memory subsystems 430 or solid state storage arrays 432. For example, an overprovisioning process could be employed. In overprovisioning, the total addressable storage space of solid state storage device 401, or a virtual subdivision thereof, is reported to be less than an actual addressable storage space. For example, solid state storage device 401 could report 100 gigabytes (100 GB) of addressable space to host system 450, but actually contain 128 GB of addressable space. Read-modify-write procedures could be enhanced by employing overprovisioning. For example, write data could be immediately written to a block of the unreported addressable space. Then background processing by solid state storage device 401 will compare the newly written data against corresponding existing data written previously to the storage array for a given block of storage space. A subsequent background read-modify-write process can then be performed by memory subsystems 430 or storage processing system 420 on the existing data against the new data written to the unreported addressable space, and the new data can then modify the existing data via a read-modify-write to create updated data to replace the existing data. The update data could then be committed to the storage block previously occupied by the existing data, located within the reported addressable space. Garbage collection can then be performed on old data portions, such as to mark that portion of the unreported addressable space as free to be used for further write transactions with background read-modified-writes.

Figure 7:
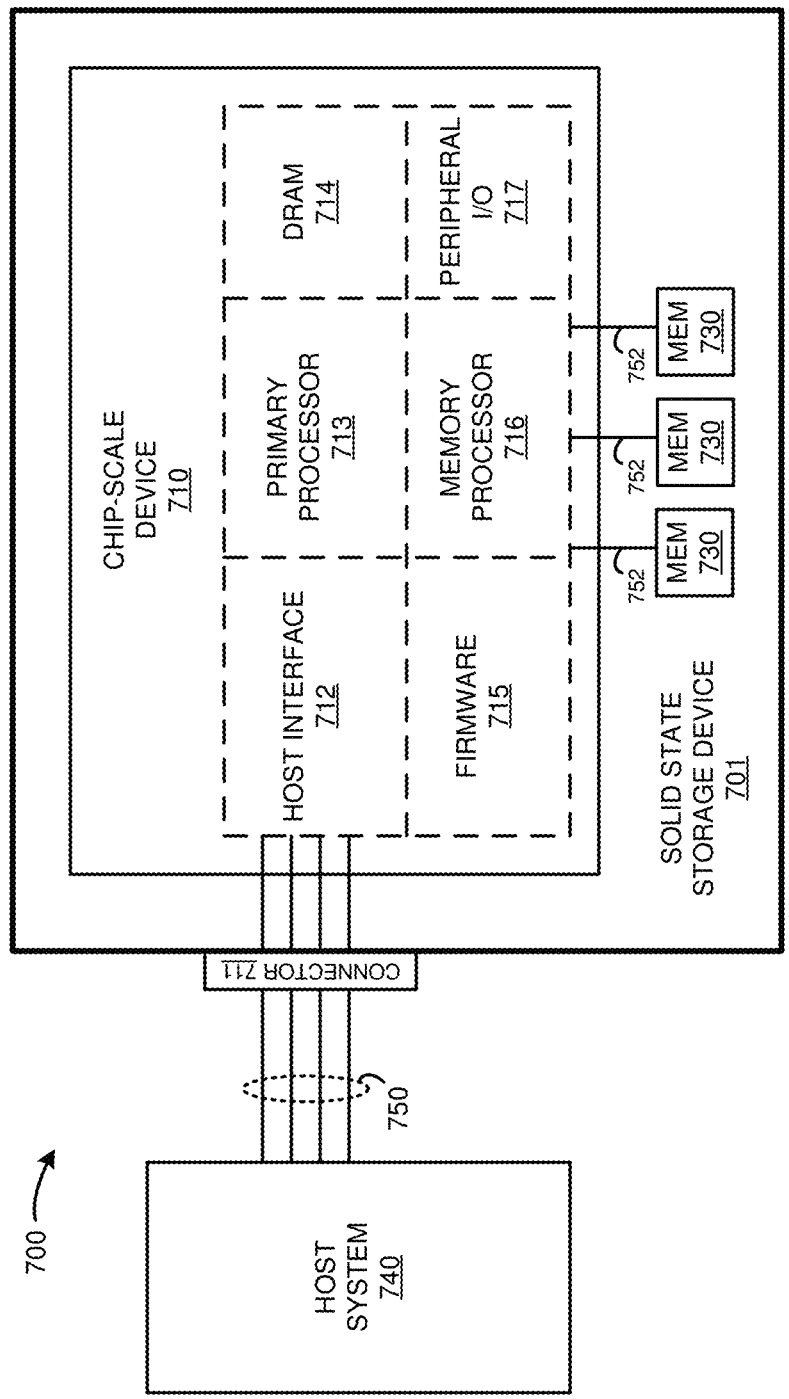
FIG. 7 is a system diagram illustrating a storage system.

FIG. 7 is a system diagram illustrating storage system 700, as an example of elements of storage system 100 found in FIG. 1, although storage system 100 could use other configurations. Solid state storage device 701 can perform operations as discussed herein for solid state storage device 101, 401, 801, or 1210, although other configurations could be employed. Storage system 700 includes host system 740 and solid state storage device 701. Host system 740 and solid state storage device 701 communicate over host interface 750.

Host system 740 comprises a computer system, such as a server, personal computer, laptop, tablet, gaming system, entertainment system, embedded computer system, industrial computer system, network system, or other computer system. Host interface 750 could comprise serial attached SCSI (SAS), aggregated SAS, Ethernet, small-computer system interface (SCSI), integrated drive electronics (IDE), Serial AT attachment interface (ATA), parallel ATA, Fibre-Channel, InfiniBand, Thunderbolt, universal serial bus (USB), FireWire, PCI Express, communication signaling, or other communication interface type, and could comprise optical, wired, wireless, or other interface media.

Solid state storage device 701 includes chip-scale device 710, connector 711, and non-volatile memories (MEM) 730. Connector 711 includes physical structure and connection components to attach a transmission medium to solid state storage device 701. Connector 711 could include a connector, antenna, port, or other interconnection components. MEM 730 each include non-transitory non-volatile computer-readable media, such as flash memory, electrically erasable and programmable memory, magnetic memory, phase change memory, optical memory, or other non-volatile memory. MEM 730 could each comprise a microchip or collection of microchips to each form a storage array.

Chip-scale device 710 includes host interface 712, primary processor 713, dynamic random access memory (DRAM) 714, firmware 715, memory processor 716, and peripheral input/output (I/O) 717. Chip-scale device could comprise a field-programmable gate array (FPGA), application specific integrated circuit (ASIC), or other integrated microchip circuit and logic elements, including combinations thereof. Each element of chip-scale device 710 can communicate over associated logic and signaling elements, not shown for clarity in FIG. 7. The signaling elements could include busses, discrete links, point-to-point links, or other links.

Host interface 712 includes circuitry and logic to communicate over host interface 750 to exchange read and write commands with host system 740 along with associated data. Primary processor 713 includes logic and processing circuitry to process read and write commands to determine data storage operations, such as data parallelization, data interleaving, read-modify-write optimization, redundancy operations, or other operations for storing and retrieving data with MEM 730 through memory processor 716. Dynamic random access memory (DRAM) 714 includes random-access memory elements and access logic for primary processor 713 to retrieve executable instructions to perform as indicated herein. DRAM 714 could also include storage allocation information or cached data associated with reads/writes. Firmware 715 includes non-volatile memory elements, such as static ram (SRAM), flash memory, or other non-volatile memory elements which store computer-readable instructions for operating chip-scale device 710 as discussed herein when executed by primary processor 713 or memory processor 716. Firmware 715 could include operating systems, applications, storage allocation information, configuration information, or other computer-readable instructions stored on a non-transitory computer-readable medium. Memory processor 716 includes logic and circuitry for reading from and writing to a plurality of memory arrays, such as MEM 730. Memory processor could also include interfacing logic for communicating over memory interfaces 752 or write circuitry for writing to flash memory or other memory technologies. Peripheral I/O 717 includes circuitry and logic for communicating with further external systems, such as computer-readable storage media, programming elements for chip-scale device 710, debugging interfaces, power control interfaces, clock control interfaces, or other external interfaces, including combinations thereof.

Figure 8:
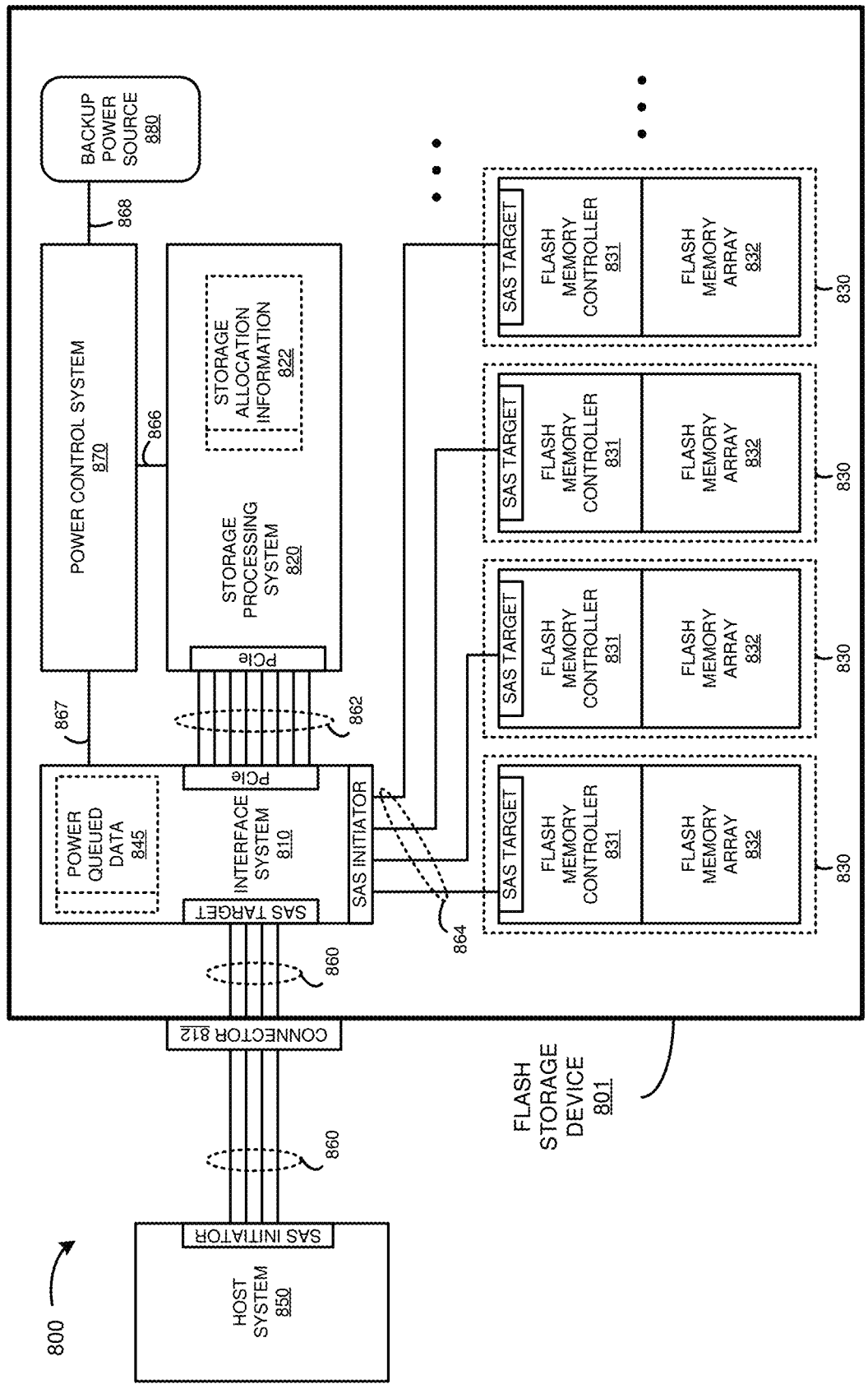
FIG. 8 is a system diagram illustrating a storage system.

FIG. 8 is a system diagram illustrating storage system 800, as an example of elements of storage system 100 found in FIG. 1, although storage system 100 could use other configurations. Storage system 800 includes flash storage device 801 and host system 850. Flash storage device 801 and host system 850 communicate over link 860, which is an aggregated serial attached SCSI (SAS) interface in this example. In FIG. 8, host system 850 can transfer data to be stored by flash storage device 801, such as a 'write' instruction where flash storage device 801 stores associated data on a computer-readable storage medium, namely ones of flash memory arrays 832. Host system 850 can also request data previously stored by flash storage device 801, such as during a 'read' instruction, and flash storage device 801 retrieves associated data and transfers the requested data to host system 850. Additionally, further transactions than writes and reads could be handled by the elements of flash storage device 801, such as metadata requests and manipulation, file or folder deletion or moving, volume information requests, file information requests, or other transactions. Although the term 'flash storage' is used in this example, it should be understood that other non-transitory computer-readable storage media and technologies could be employed.

Flash storage device 801 includes interface system 810, storage processing system 820, memory subsystems 830, power control system 870, and backup power source 880. In this example, the elements of flash storage device 801 are included within a single enclosure, such as a casing. The enclosure includes connector 812 attached thereon to communicatively couple the associated elements of flash storage device 801 to external systems, connectors, and/or cabling. The enclosure includes various printed circuit boards with the components and elements of flash storage device 801 disposed thereon. Printed circuit traces or discrete wires are employed to interconnect the various elements of flash storage device 801. If multiple printed circuit boards are employed, inter-board connectors are employed to communicatively couple each printed circuit board. In some examples, backup power source 880 is included in elements external to the enclosure of flash storage device 801.

Interface system 810 includes interface circuitry to exchange data for storage and retrieval with host system 850 over an aggregated SAS interface, namely link 860. Interface system 810 includes an SAS target portion to communicate with an SAS initiator portion of host system 850. Link 860 includes an aggregated SAS interface, which includes four individual SAS links merged into a single logical SAS link. Connector 812 serves as a user-pluggable physical connection port between host system 850 and flash storage device 801. Link 860 could include cables, wires, or optical links, including combinations thereof. Interface system 810 also includes an SAS initiator portion, a PCI Express (PCIe) interface, and associated circuitry. The SAS initiator portion of interface system 810 includes circuitry and logic for initiating instructions and commands over links 864 for exchanging data with SAS target portions of each of memory subsystems 830. The PCIe interface of interface system 810 communicates over a multi-lane PCIe interface 862 with storage processing system 820. In this example, eight lanes are shown, which could comprise a 'x8' PCIe interface, although other configurations and numbers of lanes could be used. Interface system 810 also communicates with power control system 870 to receive power status information.

Storage processing system 820 includes a microprocessor and memory, and processes data for storage and retrieval against storage allocation information as well as exchanges the data to be stored or instructions to retrieve data with interface system 810. Storage processing system 820 executes computer-readable instructions to operate as described herein. As with interface system 810, storage processing system 820 includes a PCIe interface for communicating over link 862 with interface system 810. Storage processing system 820 also communicates with power control system 870 to receive power status information, clock speed configuration information, or other power information. In this example, storage processing system 820 includes one PCIe interface with eight PCIe lanes, although other configurations and numbers of lanes could be used.

In the examples discussed herein, each of memory subsystems 830 are physical drives that are merged together into one physical enclosure with the other elements of flash storage device 801 to create a virtual drive configured and accessed by storage processing system 820. Thus, each of memory subsystems 830 are physical drives encased in a common enclosure with interface system 810 and storage processing system 820. Each of memory subsystems 830 could also be mounted on common printed circuit boards as elements of interface system 810 and storage processing system 820. Memory subsystems 830 each include a flash memory controller 831 and a flash memory array 832. In this example, each of memory subsystems 830 comprises an independent flash memory storage drive, where each includes the electronics, circuitry, and microchips typically included in a flash memory drive, such as a USB flash drive, thumb drive, solid state hard drive, or other discrete flash memory device. Flash storage device 801 includes a plurality of these memory subsystems 830, as shown in FIG. 8, and the associated electronics, circuitry, and microchips could be included on printed circuit boards with the other elements of flash storage device 801. A different number of memory subsystems 830 could be included, as indicated by the ellipses. Each flash memory controller 831 includes circuitry to store and retrieve data from associated ones of flash memory arrays 832 and exchange the data with interface system 810 over associated ones of SAS links 864. Memory subsystems 830 also each include an SAS target portion for communicating with the SAS portion of interface system 810. The SAS target portion could be included in each of flash memory controllers 831, or could be included in separate interface elements of each of memory subsystems 830. Flash memory arrays 832 each include a flash memory storage medium. It should be understood that other non-volatile memory technologies could be employed in each of memory subsystems 830, as discussed herein.

Power control system 870 comprises circuitry and logic to monitor power for elements of flash storage device 801. Power control system 870 could include circuitry and logic to provide backup power to the elements of flash storage system 801 when a primary power source (not shown in FIG. 8 for clarity) is interrupted. Power control system 870 monitors and conditions power received from at least backup power source 880 over link 868, and provides power status information to ones of storage processing system 820, interface system 810, or memory subsystems 830 over links such as link 866 and link 867. The links could include power links, discrete communication lines, or other communication interfaces, such as serial, system management bus (SMBus), inter-integrated circuit (I2C), or other communication links.

Backup power source 880 includes a power source for providing backup power to elements of flash storage device 801. Backup power source 880 could include circuitry to store power, condition power, regulate, step up or step down power sources to various voltages, monitor remaining power for power sources, or other circuitry for power supply and conditioning. The power source included in backup power source 880 could be of a variety of backup power source technology types, and could comprise batteries, capacitors, capacitor arrays, flywheels, dynamos, piezoelectric generators, solar cells, thermoelectric generator, or other power source, including combinations thereof.

Figure 9:
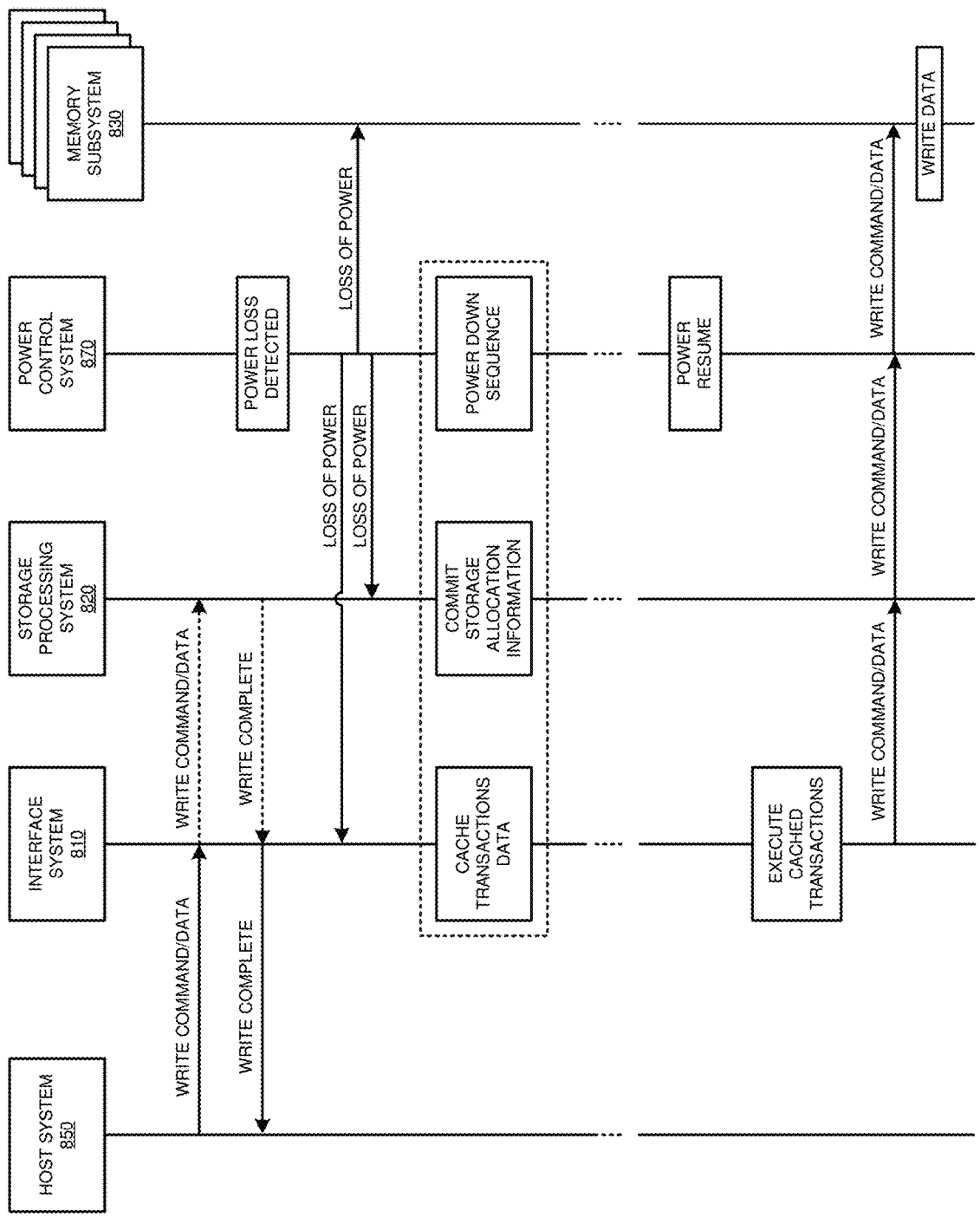
FIG. 9 is a sequence diagram illustrating a method of operation of a solid state storage device.

FIG. 9 is a sequence diagram illustrating a method of operation of storage system 800. In FIG. 9, host system 850 transfers a write instruction and associated data to be written by flash storage system 801 to interface system 810. The write instruction typically includes command information associated with the write instruction as well as a storage location indicator, such as a storage address at which to store the data. The write instruction and data is transferred over aggregated SAS link 860 in this example, and received by the SAS target portion of interface system 810. Interface system 810 could optionally provide an acknowledge message to host system 850 in response to successfully receiving the write instruction and associated data. Interface system 810 then transfers the write instruction and data to storage processing system 820 over PCIe interface 862. In typical examples, interface system 810 modifies the write instruction or data into a different communication format and protocol for transfer over interface 862, which could include generating a new write command and associating the data with the new write command for transfer over interface 862 for receipt by storage processing system 820. Storage processing system 820 receives the write command and data and issues a 'write complete' message back to interface system 810. Interface system 810 then transfers the write complete message or associated information for receipt by host system 850. The write complete message indicates that host system 850 is free to initiate further commands or end the write process associated with the write command described above. In some examples, the write complete message is associated with command queuing.

However, at some point during the write process, primary power is interrupted to flash storage device 801. The point at which power is interrupted in this example is after interface system 810 receives the write instruction from host system 850 and transfers any optional associated acknowledge message to host system 850 for the write instruction, but before the data is written to ones of flash memory arrays 832. In response to the interruption, power control system 870 detects the power interruption and provides backup power from backup power source 880 to elements of device 801. In some examples, backup power source 880 provides the backup power in a redundant manner with any primary power. If primary power is interrupted, backup power source 880 could apply backup power immediately or simultaneously so flash storage device 801 experiences no interruption in power supply.

In response to detecting the power loss, power control system 870 transfers a power loss indicator to ones of storage processing system 820, interface system 810, and memory subsystems 830. Further power information could be transferred, such as power source profiles, power down instructions, backup power technology type identifiers, remaining backup power levels, or other information. In response to receiving the power loss indicator or other information, interface system 810, storage processing system 820, and memory subsystems 830 enter into a soft power down mode.

In one example of the soft power down mode, further write commands and data are not accepted over link 460, and interface system 810 caches pending write instructions along with associated data as power queued data 845. The cached write instructions and data are ones that have not been committed to ones of memory subsystems 830. Power queued data 845 could be stored in a non-transitory computer-readable medium, such as a flash memory, SRAM, or other non-volatile memory. This non-volatile memory could be included in interface system 810, or external to interface system 810. Also in the soft power down mode, storage processing system 820 could commit pending writes within processing system 820 to ones of memory subsystems 830. For read instructions, storage processing system 820 could transfer any pending read data to interface system 810, and interface system 810 would cache any read instructions and associated data not yet provided to host system 850 in power queued data 845. Also, in the soft power down mode, storage processing system 820 commits any storage allocation information to non-volatile memory. The non-volatile memory could be the same memory which includes power queued data 845.

In another example of the soft power down mode, further write commands are not accepted over link 460 in response to entering into the soft power down mode, and pending write commands proceed. In-flight data associated with the pending write commands would be committed to ones of memory subsystems 830 as the associated write commands complete. Storage processing system 420 then commits any storage allocation information kept in volatile memory elements into non-volatile memory, such as a flash memory, SRAM, or other non-volatile memory. Storage processing system 420 could commit the storage allocation information into ones of memory subsystems 430, to be stored with host data, or within specially partitioned storage areas of memory subsystems 430. The specially partitioned storage areas for committing storage allocation information during soft power down operations could be unreported addressable space of memory subsystems 430, such as that used in overprovisioning.

Although in the examples above interface system 810 caches pending instructions and data, it should understood that the processing and transfer of various instructions and data could be at any stage of processing within flash storage device 801. Interface system 810 and storage processing system 820 communicate to coordinate which instructions and data will be completed or committed, and which will be cached before power loss. A predetermined power down sequence could be employed for the soft power down operations, or the soft power down process could be dependent upon the quantity of pending transactions and available backup power. For example, the amount of time within which the soft power down activities must occur varies upon many factors, such as remaining backup power, a quantity of pending transactions, or other factors. Storage processing system 820 could determine a threshold quantity of instructions to complete based on remaining backup power indicators as provided by power control system 870, and any instructions exceeding the threshold number would be cached. Furthermore, during a power loss, pending read instructions may be inhibited from transfer over host interface 860, as host system 850 may also be without power. In some examples, incoming write data can be marked or flagged as critical data by a host system, and such data could be committed ahead of other non-critical data to ones of memory subsystem 830, and the non-critical data would be cached as power queued data 845.

Power control system 870 could receive status indicators from interface system 810, storage processing system 820, or memory subsystems 830 which indicate a state of soft power down sequencing, such as if all pending transactions and storage allocation information have been committed or cached. Power control system 870 powers down elements of flash storage device 801 in response to these status indicators, such as powering down ones of memory subsystems 830 when all write data or storage allocation information has been committed, powering down interface system 810 when all remaining pending transactions have been cached, and powering down storage processing system 820 when storage allocation information has been committed. It should be understood that other variations on power down sequencing could occur.

At some later point in time, primary power resumes. Primary power could resume while flash storage device 801 is still receiving backup power, and no interruption in the operation of flash storage device 801 may occur. However, when the various soft power down operations have been performed in response to a loss of primary power, then power control system 870 applies power to the various elements of flash storage device 801 in response to primary power resuming. Also in response to power resuming, interface system 810 retrieves cached transactions and data from power queued data 845 and executes these transactions. For example, pending and cached writes could be committed to ones of memory subsystems 830, and pending reads could be performed and associated data returned to host system 850. In examples where the storage allocation information is committed or cached into ones of memory subsystems 830, storage processing system 420 could read this storage allocation information from the associated ones of memory subsystems 830 and transfer this information to a volatile memory location, such as DRAM or a buffer.

Figure 10:
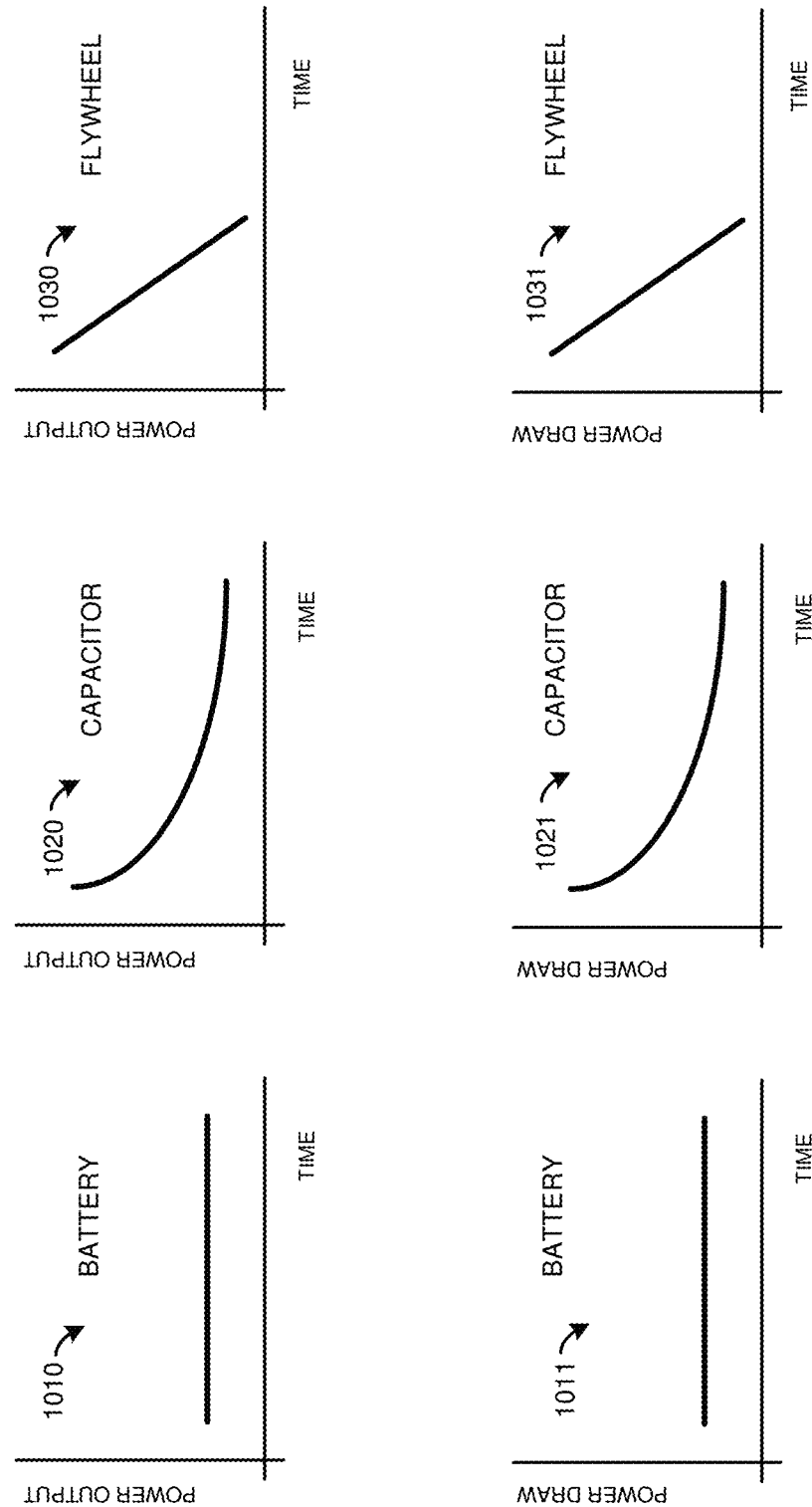
FIG. 10 includes graphs illustrating example power down curves.

FIG. 10 includes graphs 1010-1031 illustrating example power down curves. Backup power source 880 of FIG. 8 could include a variety of backup power source technology types, as discussed above. Each power source type or technology typically has an associated power output and power profile, which depends highly on the technology and elements employed in the type of backup power source or technology type. Each graph in the top portion of FIG. 10, namely graphs 1010, 1020, and 1030, includes a horizontal time axis and a vertical power output axis. The power output axis relates to the power output of a type of power source, and is related to the passage of time along the horizontal time axis. Each graph in the bottom portion of FIG. 10, namely graphs 1011, 1021, and 1031, includes a horizontal time axis and a vertical power draw axis. The power draw axis relates to a forced power draw of flash storage device 801, and is related to the passage of time along the horizontal time axis. In examples where backup power source 880 is included in flash storage device 801, the power draw profile could be pre-programmed into power control system 870 according to the power source type. In other examples, the power draw profile could be programmable over an external configuration interface.

Graph 1010 indicates the typical power output of a battery-based power source, graph 1020 indicates the typical power output of a capacitor-based power source, and graph 1030 indicates the typical power output of a flywheel-based power source. Although three different power source types or technologies are discussed in these graphs, other power types could be employed with associated power output profiles.

Graph 1011 indicates the forced power draw of flash storage device 801 when using a backup power source employing a battery-based power source. Graph 1021 indicates the forced power draw of flash storage device 801 when using a backup power source employing a capacitor or array of capacitors. Graph 1031 indicates the forced power draw of flash storage device 801 when using a backup power source employing a flywheel.

The forced power draw includes an artificially induced power draw, or associated current draw, for flash storage system 801 when powered by backup power source 880. A power draw could be forced by power control system 870. Power control system 870 could control various parameters of operation of flash storage system 801 to match the power draw of flash storage system 801 to the associated source power output curves. This matching could include powering down various elements of flash storage device 801 in a sequence which reduces power draw according to the typical power output indicated by any of graphs 1010, 1020, or 1030. This matching could include ramping down clock speeds or clock frequencies of various elements of flash storage device 801 to induce a power draw matching that of any of graphs 1010, 1020, or 1030. In other examples, powering down ones of interface system 810, storage processing system 820, or memory subsystems 830 is performed a predetermined sequence in accordance with the power output curve associated with the backup power source type.

In yet further examples, power control system 870 instructs elements of device 801 to throttle the various interfaces and elements, such as memory elements. In throttling examples, interface speeds or a speed of interface transactions is correlated to a power source type, based on the power consumption of the associated circuit and logic elements. For example, in battery power sources, the lower the power drawn correlates to more energy being available so elements of flash storage device 801 can be throttled down in response to a primary power interruption. In flywheel power sources, power down completion time needs to be minimized to ensure maximum energy can be drawn from the flywheel, and elements of flash storage device 801 are throttled up to induce a high power draw for a shorter amount of time. In capacitor power sources, the throttling should be proportional to the voltage of the capacitor or capacitor array, so that when the capacitor has a high voltage, the elements of flash storage device 801 are throttled up to induce a high power draw, and as the voltage of the capacitor drops, a throttling down would increase proportionally.

Advantageously, data integrity can be better maintained when a power down sequence as described herein allows maximum use of backup power when maximal power is available from a backup power source, and minimize use of backup power when minimal backup power output is available. For example, critical operations could be committed during the times when maximum backup power is available, and less critical operations could be performed during times when minimal backup power is available. Additionally, memory devices involved in storing power queued data 845 could include lower power draw elements as compared to memory subsystems 830, and thus pending transactions could be preferably cached by interface system 810 rather than committed to relatively high-power draw memory subsystems 830. Also, by intelligently ramping down power draw according to the specific backup power source technology or type, smaller backup power sources could be employed as power draw is more tailored to such sources. Although the power down profiles and associated throttling or induced power draw discussed in FIG. 10 are applied to elements of FIG. 8, it should be understood that these techniques and systems could be applied to any of the storage systems discussed herein.

In a further example, a cost of a primary source of energy instead of a backup power source is considered when throttling the various elements of device 801. For instance, during peak energy usage hours, energy costs may be higher, and during non-peak energy hours, energy costs may be lower. During high energy cost times, the elements of device 801 could be throttled to a lower performance operation, such as by slowing memory interfaces, or slowing a processor clock speed, among other performance throttling modifications. Likewise, during low energy cost times, the elements of device 801 could be allowed to operate at a maximum or higher level of performance and no throttling applied.

Figure 11:
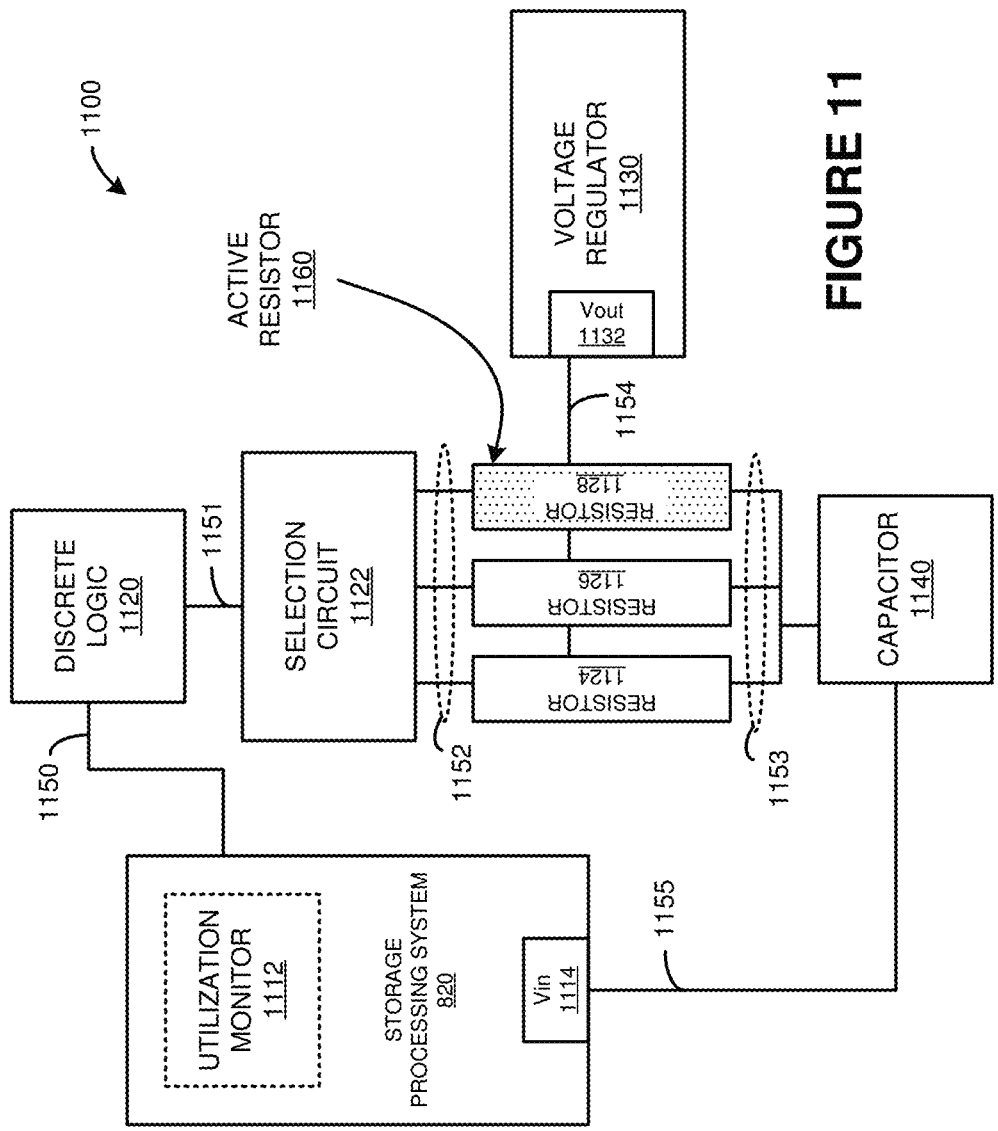
FIG. 11 is a system diagram illustrating a storage system.

FIG. 11 is a system diagram illustrating storage system 1100. In FIG. 11, portions of flash storage system 801 are included for exemplary purposes, and it should be understood that other storage system elements discussed herein could instead be employed. Storage system 1100 includes storage processing system 820 of flash storage system 801, discrete logic 1120, selection circuit 1122, resistors 1124-1128, voltage regulator 1130, and capacitor 1140. The elements of FIG. 11 are employed as clock rate optimization circuitry in a clock frequency controlling scheme, where the clock rate or clock frequency for a clock system or clock generator circuit associated with storage processing system 820 of flash storage device 801 is varied based on a utilization of processing portions of storage processing system 820. The elements of FIG. 11 could be included in flash storage system 801, such as in a common enclosure or on common printed circuit boards.

Discrete logic 1120 includes communication logic to interpret indicators transferred by utilization monitor 1112, such as logic elements, communication interfaces, processing systems, or other circuit elements. Selection circuit 1122 includes solid-state switching elements, such as transistors, transmission gates, or other selection logic to select one of resistors 1124-1128 and connect the selected resistor to Vout pin 1132 of voltage regulator 1130. Resistors 1124-1128 include resistors, or could include active resistor elements, such as temperature-dependent resistors, voltage or current controlled transistors, or other resistor-like elements. Voltage regulator 1130 includes voltage regulation circuitry to provide power at a predetermined voltage at Vout pin 1132 based on varying voltages applied to voltage regulator 1130. Capacitor 1140 includes capacitor circuit elements or arrays of capacitors. Links 1150-1155 include circuit traces, discrete wires, optical links, or other media to communicate indicators, voltages, currents, clock speeds, or power between the various elements of FIG. 11.

In FIG. 11, storage processing system 820 includes utilization monitor 1112. Utilization monitor 1112 could include a software process executed by storage processing system 820 which monitors various parameters of utilization to determine a utilization indicator. The various parameters of utilization could include data throughput, processor utilization, memory usage, instruction load, power draw, active processes, active transactions, or other parameters. Utilization monitor 1112 provides an indicator of utilization over link 1150 to discrete logic 1120. The indicator could be a voltage level proportional to utilization, a multi-level digitally encoded indicator, or a binary indicator, among other indicators.

When the utilization of storage processing system 820 is low, such as during idle states or low throughput states, the indicator could remain in an inactive condition. However, in response to a higher utilization, such as a non-idle state or high throughput state, the indicator could transition to an active condition. Other indicator states could be employed, such as a proportional indicator that varies according to utilization levels. Discrete logic 1120 then communicates with selection circuit 1122 to select one of resistors 1124-1128. Selection circuit 1122 could include a transistor switch or other switching elements. The particular one of resistors 1124-1128 which is selected by selection circuit 1122 controls the resistance applied to Vout pin 1132 of voltage regulator 1130, allowing for adjustment in the output supply of voltage regulator 1130. As the utilization increases, the resistance is adjusted to increase the output voltage of voltage regulator 1130. In this example, resistor 1128 is active resistor 1160, and could correspond to a low utilization, and thus a low associated output voltage of voltage regulator 1130. In other examples, such as during high utilization, one of resistor 1124 or 1126 could be selected resulting in a correspondingly higher output voltage of voltage regulator 1130.

This adjusted output voltage of voltage regulator 1130 is then applied to capacitor 1140. Capacitor 1140 conditions the output voltage of voltage regulator 1130 to reduce ripple, noise, transition glitches, and provide a smooth voltage to Vin pin 1144 of flash storage device 801. In this example, Vin pin 1144 controls a clock frequency applied to storage processing system 820, where a clock generation portion of flash storage device 801 or storage processing system 820 determines a clock rate or clock frequency proportionally to the voltage applied to Vin pin 1144. Thus, as the utilization level of elements of flash storage device 801, such as storage processing system 820, increase from a low utilization level, the clock frequency is increased in speed. Likewise, as the utilization level of elements of flash storage device 801, such as storage processing system 820, decrease from a high utilization level, the clock frequency is decreased in speed. Although the applied voltage corresponds to a clock frequency in this example, in other examples the applied voltage could correspond to a core voltage of semiconductor portions of flash storage device 801, where reduced core voltages correspond to reduced utilization levels, and vice versa. In other examples, external clock generation circuits have an output clock rate or frequency modified based on the utilization level discussed herein.

Thresholds could be employed for the various utilization levels. For example, when utilization is below a first threshold, then the clock speed is adjusted to a first speed via a first voltage level applied to Vin pin 1144, when utilization is between the first threshold and a second threshold (where the second threshold is higher than the first threshold), then the clock speed is adjusted to a second speed higher than the first speed via a second voltage level applied to Vin pin 1144, and when utilization is higher than the second threshold, then the clock speed is adjusted to a third speed higher than the second speed via a third voltage level applied to Vin pin 1144.

In further examples, the output of utilization monitor 1112 is used to control link aggregation of a front-end interface, such as a host interface. For example, when an aggregated front-end SAS interface is used to communicate with a host system, the amount of aggregation can be proportional to utilization of processing system 820. During low utilization times, such as during idle, the number of links aggregated into the host interface can be reduced, possibly to one physical link. Likewise, during times of high utilization, such as when utilization exceeds a first utilization threshold, an additional physical link can be aggregated into the host interface. Further utilization thresholds could increase further amounts of aggregated physical links. The utilization level information detected by utilization monitor 1112 could be provided to a front-end interface system for responsively controlling the amount of link aggregation.

In yet further examples, other elements of flash storage system 801 have a clock speed or operation rate modified as done for storage processing system 820 above. For example, memory subsystems 830 could each be throttled or have a modified clock speed according to utilization monitor 1112. Thus, performance such as transaction speed or clock speed of all elements of flash storage system 801 could be actively and dynamically scaled according to the read/write demand of the host system.

Figure 12:
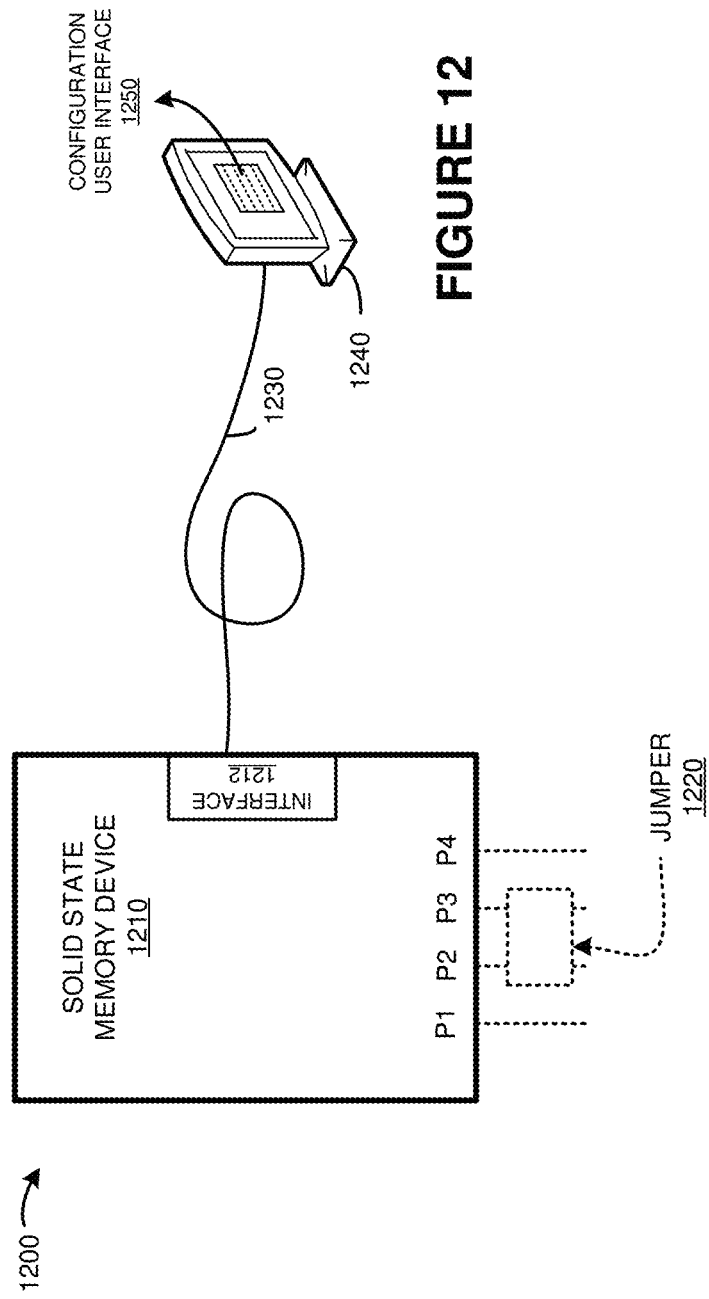
FIG. 12 is a system diagram illustrating a storage system.

FIG. 12 is a system diagram illustrating storage system 1200. Storage system 1200 includes solid state memory device 1210 and configuration system 1240. Solid state memory device 1210 could be an example of devices 101, 401, 701, and 801, although devices 101, 401, 701, and 801 could use other configurations. In this example, solid state memory device 1210 includes interface 1212 and optional external configuration pins P1-P4. Interface 1212 comprises a configuration interface for communicating configuration information to configuration system 1240 over configuration link 1230 and receiving configuration instructions from configuration system 1240 over configuration link 1230. Configuration link 1230 could include further systems, networks, links, routers, switches, or other communication equipment. In some examples, configuration link 1230 is provided over a front-end interface, such as the various host interfaces described herein.

Configuration system 1240 comprises a computer system, processing system, network system, user terminal, remote terminal, web interface, or other configuration system. Configuration system 1240 includes configuration user interface 1250, which allows a user of configuration system 1240 to create and transfer configuration instructions to solid state memory device 1210. Configuration user interface 1250 also can present a graphical or text-based user interface to a user for displaying a present configuration or configuration options to the user.

The configuration of solid state memory device 1210 can be modified using configuration user interface 1250 or optional configuration pins P1-P4. In some examples, pins P1-P4 can be spanned by a removable jumper 1220 or multiple jumpers. A user can alter a configuration of solid state memory device 1210 by bridging various ones of pins P1-P4. Pins P1-P4 interface with logic or circuitry internal to solid state memory device 1210, such as programmable logic which triggers a script or software routine to responsively configure firmware or software managing the various elements of solid state memory system 1210. Additionally, a user can alter and view configurations of solid state memory device 1210 through configuration user interface 1250. In some examples, the function of pins P1-P4 can be altered by configuration user interface 1250, so that commonly used functions could be easily selected by a jumper or jumpers. A factory-set configuration of pins P1-P4 could be altered by configuration user interface 1250. Although four pins are shown in FIG. 12, it should be understood that a different number of configuration pins could be employed. Instead of configuration pins, micro-switches could be employed.

In typical examples of memory systems, only limited options can be configured. These options can include timing, speed, or other settings. Also, a user can physically change a configuration by altering a physically installed size or number of memory devices. However, in this example, further configurations are provided. The front-end or host interface could be altered, such as changing a link aggregation configuration, an interface speed, or other parameters of a host interface. A capacity of solid state memory device 1210 could be altered, so as to limit a capacity or select from among various potential capacities. Various performance parameters could be altered. For example, a thermal shut off feature could be altered or enabled/disabled to disable device 1210 or portions thereof according to temperature thresholds. A read-only status could be enabled/disabled, or selectively applied to subdivisions of the total storage capacity, such as different volumes. A redundancy scheme could also be selected, such as a redundant array of independent disk (RAID) array configuration. Various solid state media of device 1210 could be subdivided to create separate RAID volumes or redundant volumes. Striping among various memory subsystems could also be employed. Encryption configurations could also be applied, such as encryption schemes, passwords, encryption keys, or other encryption configurations for data stored within device 1210. Encryption keys could be transferred to device 1210 over interface 1212. Compression schemes could also be applied to data read from and written to the various memory subsystems, and the compression schemes could be selected among over the various configuration or jumper interfaces, or a compression scheme could be uploaded via the configuration interfaces. Link aggregation could also be altered by the configuration elements described in FIG. 12. For example, a number of SAS links could be configured to be aggregated into a single logical link, or separated into separate links, and associated with various volumes. An associated storage processing system could be configured to selectively merge or separate ones of the physical links into the aggregated multi-channel interface based on instructions received over the configuration interfaces.

In typical examples, a physical drive is an actual tangible unit of hardware of a disk, solid state, tape, or other storage drive. A logical drive typically describes a part of a physical disk or physical storage device that has been partitioned and allocated as an independent unit, and functions as a separate drive to the host system. For example, one physical drive could be partitioned into logical drives F:, G:, and H:, each letter representing a separate logical drive but all logical drives still part of the one physical drive. Using logical drives is one method of organizing large units of memory capacity into smaller units. A virtual drive is typically an abstraction, such as by spanning, of multiple physical drives or logical drives to represent a single larger drive to a host system. In the examples discussed herein, the various solid state memory subsystems are physical drives that are merged together into one enclosure to create a virtual drive configured and accessed by the associated storage processing system, such as storage processing system 820, among others. The physical drive can have logical volumes associated therewith, and the virtual drives can also have logical volumes associated therewith. The associated storage processing system binds the virtual drive(s) and associated memory subsystems to target ports on the associated interface system, such as interface system 810. Target and initiator ports on the interface system are configured and controlled by the storage processing system. The virtual drives that have been bound to the target ports are then presented to external systems, such as a host system, as a physical drive.

In addition, the configuration elements of solid state memory device 1210 could also alter how solid state memory device 1210 appears to a host system. Virtual subdivisions of the available storage space of device 1210 could be configured, where the configuration indicates a quantity and arrangement of virtual subdivisions. For example, these virtual subdivisions could present a plurality of virtual drive volumes to a host system. These virtual volumes could be provided over various ones of front-end or host interface links, such as ones of SAS links providing an associated volume. Thus, a single device 1210 could appear to a host system as several separate 'physical' drives over a single host interface or a plurality of host links comprising a host interface. As a further example, each of SAS links in host interface 460 could be configured to correspond to a separate virtual drive and each virtual drive could then be presented to host system 450 or to multiple host systems as separate volumes or drives over separate links. The various virtual drives could each comprise different configurations such as sizes, capacities, performances, redundancy, or other parameters.

Configuration pins P1-P4 could be employed to select among predetermined volume or drive configurations. For example, first ones of pins P1-P4 could select a first virtual volume and host interface configuration, and second ones of pins P1-P4 could select a second virtual volume and host interface configuration. If multiple virtual drives are employed, then individual ones of the virtual drives could be associated with individual ones of host interface links. The configuration pins P1-P4 could select among these interface and volume configurations. For example, in FIG. 8, a first plurality of links 860 could correspond to a first virtual drive, and a second plurality of links 860 could correspond to a second virtual drive. This host system 850 would see flash storage device 801 as two separate drives, with each drive using ones of links 860. The virtual drives could each span all of memory subsystems 830, or could be apportioned across ones of memory subsystems 830, and consequently managed by storage processing system 820. The pins or user configuration interface could also alter identification parameters of a solid state device, such as addressing parameters, SCSI addresses or identifiers, among other identification parameters.

Data parallelization could be performed for each volume, where data received for a first volume is parallelized among memory subsystems associated with the first volume, and data received for a second volume is parallelized among memory subsystems associated with the second volume. The various volumes need not comprise exclusive memory subsystems, as the associated storage processor could determine and maintain storage allocation information to mix parallelization of data among all memory subsystems while maintaining separate volume allocations across the various memory subsystems. Thus, all memory subsystems could be employed for storage among multiple logical volumes, and the amount of storage allocated to each volume could be dynamically adjusted by modifying the storage allocation information accordingly. Configuration user interface 1250 or pins P1-P4 could be used to adjust these volume allocations and configurations.

For each of the configurations discussed above, a processing system, such as a storage processing system, could apply the configurations to device 1210. Associated firmware could be modified, updated, or executed using configurations of jumpers P1-P4 or configuration user interface 1250. Additionally, the processing system, such as processing system 120, 420, 713, or 820 can perform other functions, such as orchestrate communication between front-end interfaces and back-end interfaces, manage link aggregation, parallelize data, determining addressing associated with parallelized data portions or segments, data integrity checks, such as error checking and correction, data buffering, and optimization of parallelized data portion size to maximize performance of the systems discussed herein. Other operations as discussed herein could be performed by associated processing systems. Additionally, front-end interface systems, such as interface systems 110, 410, 712, or 810 can provide performance functions such as link aggregation, error detection and correction, I/O processing, buffering, or other performance off-loading for features of host interfaces.

Figure 13:
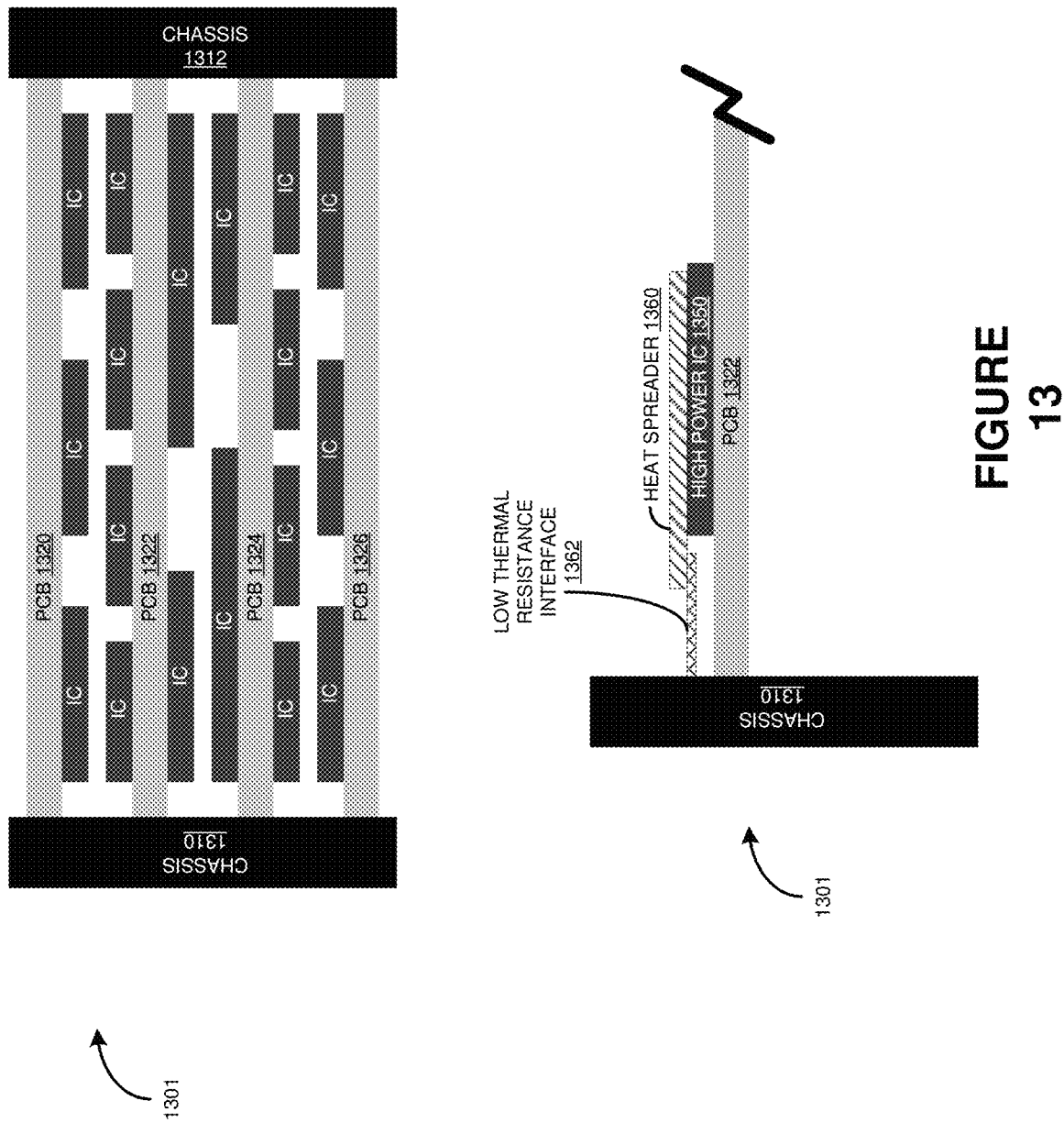
FIG. 13 includes side view diagrams illustrating a storage system.

FIG. 13 includes side view diagrams illustrating storage system 1301. The diagrams illustrated in FIG. 13 are intended to illustrate the mechanical design and structure of storage system 1301. The upper diagram illustrates a side-view of an assembled storage system, whereas the lower diagram illustrates a cutaway/simplified view including a reduced number of elements of storage system 1301 to emphasize thermal design elements. Storage system 1301 is an example of devices 101, 401, 701, 801, or 1210, although devices 101, 401, 701, 801, or 1210 could use other configurations.

Storage system 1301 includes chassis 1310-1312 which provides structural support and mountings for mating the various printed circuit boards (PCB) of storage system 1301. In this example, storage system 1301 includes four PCBs, namely PCB 1320-1326. Each PCB has a plurality of integrated circuit chips (IC) disposed thereon. The ICs could be attached by solder and/or adhesive to the associated PCB. As shown in FIG. 13, the ICs are arranged on both sides of many of the PCBs, but are not disposed on an outside surface of PCBs 1320 and 1326.

In order to maximize the number of ICs in storage system 1301, which also maximizes the memory density and reduces the size of storage system 1301, some outer surfaces of storage system 1301 are formed from surfaces of PCBs 1320 and 1326. In this manner, no additional casing or enclosure elements are employed on the outer surfaces defined by PCBs 1320 and 1326, and a usable volume for storage system 1301 is maximized for the external dimensions. In this example, chassis elements 1310-1312 form the left/right outer surfaces, and PCBs 1320 and 1326 form the top/bottom outer surfaces. Since this view is a side view, the ends projecting into the diagram and out of the diagram could be formed with further structural elements, such as chassis elements, end caps, connectors, or other elements. The outer surfaces of PCBs 1320 and 1326 could be coated with a non-conductive or protective coating, such as paint, solder mask, decals, stickers, or other coatings or layers.

In this example, chassis 1310-1312 are structural elements configured to mate with and hold the plurality of PCBs, where the chassis structural elements and the PCBs are assembled to comprise an enclosure for storage system 1301. In some examples, a tongue-and-groove style of configuration could be employed, such as slots or grooves to hold the edges of the plurality of PCBs. An outer surface of a PCB comprises a first outer surface of the enclosure and an outer surface of a second PCB comprises a second outer surface of the enclosure.

The lower diagram in FIG. 13 shows a simplified and cut-away side view of some elements of storage system 1301. Chassis 1310 and PCB 1322 are included to emphasize thermal management features. Internal to storage system 1301 are high power components, namely components which use a relatively large amount of power and thus become hot during operation. Due to the high-density mechanical design of storage system 1301, heat from various hot ICs is desired to be channeled to outside enclosure surfaces for radiation and subsequent cooling. These hot ICs may not have immediate access to outside surfaces, and may be disposed in centralized locations.

In the lower diagram, a high-power IC is disposed on one surface of PCB 1322, namely IC 1350. This IC could include a processor or other high-density and high-power utilization integrated circuit, such as processing system 120, 420, 713, or 820, or chip-scale device 710. Other ICs could be configured in this manner as well. Heat spreader 1360 is thermally bonded to IC 1350, possibly with heat sink compound, thermally conductive adhesive, or with fasteners connected to PCB 1322, among other thermal bonding techniques to maximize heat transfer from IC 1350 to heat spreader 1360. Heat spreader 1360 also overhangs IC 1350 and is further thermally bonded to a low thermal resistance interface 1362. Heat spreader 1360 and interface 1362 could be thermally bonded similarly to heat spreader 1360 and IC 1322. Low thermal resistance interface 1362 is then thermally bonded to chassis 1310, possibly through a groove or slot in chassis 1310. In this example, chassis 1310 and 1312 comprise thermally conductive materials, such as metal, ceramic, plastic, or other material, and are able to sink heat away from high-power ICs, such as high-power IC 1350.

Heat spreader 1360 comprises any material that efficiently transports heat from a hot location to a cooler location, such as by heat dissipation, conduction, or other heat transfer techniques. For example, heat spreader 1360 could comprise a metal composition, such as copper. In other examples, graphite or planar heat pipes are employed. Interface 1362 comprises any material with a high thermal conductivity and transports heat to chassis 1310 by any physical means, such as conduction, convection, advection, radiation, or a combination thereof. For example, interface 1362 could comprise metal compositions, heat pipes, graphite, or other materials, including combinations thereof. Thus, thermal conductivity anisotropy is aligned for heat spreader 1360 and interface 1362 such that the thermal resistance minimum is aligned with the direction of optimal heat flow. In further example, heat spreader 1360 is elongated and allowed to thermally contact chassis 1310, and interface 1362 could be omitted.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
   a plurality of storage drives each comprising an associated drive Peripheral Component Interconnect Express (PCIe) interface; and
   a control system configured to:
      receive, over a host PCIe link, write operations for storage of data by the data storage device;
      process the write operations against storage allocation information to apportion the data for storage among more than one of the storage drives based at least on processing the data against the storage allocation information to determine target storage drives to store the data; and
      transfer corresponding portions of the data to associated storage drives over corresponding drive PCIe interfaces.

2. The data storage device of claim 1, comprising:
   the storage drives configured to receive the corresponding portions of the data and responsively store the corresponding portions on associated solid state storage media.

3. The data storage device of claim 1, wherein apportioning the data for storage among more than one of the storage drives comprises parallelizing the data for storage among the more than one of the storage drives.

4. The data storage device of claim 1, comprising:
   the control system configured to communicate with a host system over the host PCIe link to receive one or more read operations for retrieving data previously stored by the data storage device;
   the control system configured to process at least read addresses indicated by the one or more read operations against storage locations indicated by the storage allocation information to determine ones of the storage drives to handle the read operations, and transfer the read operations over the drive PCIe interfaces to associated ones of the storage drives;
   the storage drives configured to receive associated ones of the read operations, and in response, retrieve read data from the associated solid-state storage media and transfer the read data to the control system for transfer to the host system over the host PCIe link.

5. The data storage system of claim 4, comprising:
   based at least on the read data having been apportioned during storage over the more than one of the storage drives, the control system configured to process the read data received from the more than one of the storage drives against the storage allocation information to merge the read data into merged read data, and transfer the merged read data to the host system over the host PCIe link.

6. The data storage device of claim 1, comprising:
   the control system configured to apportion the data for storage among the more than one of the storage drives by at least forming the data into at least partially redundant data portions for storage as the portions by an associated storage drives.

7. The data storage device of claim 1, comprising:
   a configuration system configured to receive a storage configuration over the host PCIe link, wherein the storage configuration indicates at least a quantity and arrangement of virtual volumes;
   the control system configured to apply the storage configuration to subdivide the storage drives into a plurality of virtual volumes;
   the control system configured to present the plurality of virtual volumes as separate drive volumes to a host system over the host PCIe link;
   wherein storage operations received over the host PCIe link comprise indicators of at least one of the drive volumes for handling of associated data; and
   the control system configured to apportion the associated data for storage among target storage drives which comprise indicated ones of the virtual volumes.

8. The data storage device of claim 1, comprising:
   a power control system configured to receive backup power, detect an interruption in a primary power, and in response provide the backup power to the data storage device;

the control system configured to perform a soft power down operation to commit at least pending write instructions and associated write data to at least one of the storage drives in response to the interruption in the primary power; and the control system configured to commit the storage allocation information to non-volatile memory responsive to the soft power down operation.

9. A method comprising:

in a control system, receiving, over a host Peripheral Component Interconnect Express (PCIe) link, write operations for storage of data by a data storage device;

in the control system, processing the write operations against storage allocation information to apportion the data for storage among more than one of a plurality of storage drives each comprising an associated drive PCIe interface based at least on processing the data against the storage allocation information to determine target storage drives to store the data; and in the control system, transferring corresponding portions of the data to associated storage drives over corresponding drive PCIe interfaces.

10. The method of claim 9, further comprising:

in the storage drives, receiving the corresponding portions of the data and responsively storing the corresponding portions on associated solid state storage media.

11. The method of claim 9, wherein apportioning the data for storage among more than one of the storage drives comprises parallelizing the data for storage among the more than one of the storage drives.

12. The method of claim 9, further comprising:

in the control system, communicating with a host system over the host PCIe link to receive one or more read operations for retrieving data previously stored by the data storage device;

in the control system, processing at least read addresses indicated by the one or more read operations against storage locations indicated by the storage allocation information to determine ones of the storage drives to handle the read operations, and transferring the read operations over the drive PCIe interfaces to associated ones of the storage drives; and in the storage drives, receiving associated ones of the read operations, and in response, retrieving read data from the associated solid-state storage media and transferring the read data to the control system for transfer to the host system over the host PCIe link.

13. The method of claim 12, further comprising:

based at least on the read data having been apportioned during storage over the more than one of the storage drives, in the control system, processing the read data received from the more than one of the storage drives against the storage allocation information to merge the read data into merged read data, and transferring the merged read data to the host system over the host PCIe link.

14. The method of claim 9, further comprising:

in the control system, apportioning the data for storage among the more than one of the storage drives by at least forming the data into at least partially redundant data portions for storage as the portions by an associated storage drives.

15. The method of claim 9, further comprising:

in a configuration system, receiving a storage configuration over the host PCIe link, wherein the storage configuration indicates at least a quantity and arrangement of virtual volumes;

in the control system, applying the storage configuration to subdivide the storage drives into a plurality of virtual volumes;

in the control system, presenting the plurality of virtual volumes as separate drive volumes to a host system over the host PCIe link;

wherein storage operations received over the host PCIe link comprise indicators of at least one of the drive volumes for handling of associated data; and in the control system, apportioning the associated data for storage among target storage drives which comprise indicated ones of the virtual volumes.

16. The method of claim 9, further comprising:

in a power control system, receiving backup power, detecting an interruption in a primary power, and in response providing the backup power to the data storage device;

in the control system, performing a soft power down operation to commit at least pending write instructions and associated write data to at least one of the storage drives in response to the interruption in the primary power; and in the control system, committing the storage allocation information to non-volatile memory responsive to the soft power down operation.

17. An apparatus, comprising:

a host Peripheral Component Interconnect Express (PCIe) link configured to receive write operations for storage of data by a data storage device;

control circuitry configured to process the write operations against storage allocation information to apportion the data for storage among more than one of a plurality of storage drives each comprising an associated drive PCIe interface based at least on processing the data against the storage allocation information to determine target storage drives among which to parallelize the data for storage; and a drive interface configured to transfer corresponding portions of the data to associated storage drives over corresponding drive PCIe interfaces.

* * * * *